(12) United States Patent
Hashimoto et al.

(10) Patent No.: US 11,780,155 B2
(45) Date of Patent: Oct. 10, 2023

(54) METHOD FOR MANUFACTURING THREE-DIMENSIONAL SHAPED OBJECT AND THREE-DIMENSIONAL SHAPING APPARATUS

(71) Applicant: Seiko Epson Corporation, Tokyo (JP)

(72) Inventors: Taki Hashimoto, Shiojiri (JP); Koichi Saito, Matsumoto (JP)

(73) Assignee: SEIKO EPSON CORPORATION

(*) Notice: Subject to any disclaimer, the term of this patent is extended or adjusted under 35 U.S.C. 154(b) by 0 days.

(21) Appl. No.: 17/719,435

(22) Filed: Apr. 13, 2022

(65) Prior Publication Data

US 2022/0332037 A1 Oct. 20, 2022

(30) Foreign Application Priority Data

Apr. 14, 2021 (JP) ................................ 2021-068182

(51) Int. Cl.
*B29C 64/106* (2017.01)
*B29C 64/209* (2017.01)
*B29C 64/314* (2017.01)
*B29C 64/321* (2017.01)
*B33Y 50/02* (2015.01)
*B33Y 10/00* (2015.01)
(Continued)

(52) U.S. Cl.
CPC .......... *B29C 64/106* (2017.08); *B29C 64/209* (2017.08); *B29C 64/314* (2017.08); *B29C 64/321* (2017.08); *B29C 64/393* (2017.08); *B33Y 10/00* (2014.12); *B33Y 30/00* (2014.12); *B33Y 40/10* (2020.01); *B33Y 50/02* (2014.12); *B29C 64/386* (2017.08); *B33Y 50/00* (2014.12)

(58) Field of Classification Search
CPC ... B29C 64/106; B29C 64/314; B29C 64/321; B29C 64/209; B29C 64/393; B29C 64/386; B33Y 10/00; B33Y 30/00; B33Y 50/00; B33Y 50/02; B33Y 40/00
USPC ......................................................... 264/308
See application file for complete search history.

(56) References Cited

U.S. PATENT DOCUMENTS

2007/0179657 A1* 8/2007 Holzwarth ............ B29C 64/106
 700/187
2019/0283321 A1* 9/2019 Mizukami ............... C04B 35/48

FOREIGN PATENT DOCUMENTS

JP 2009-525207 A 7/2009
WO 2007089576 A2 8/2007

* cited by examiner

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

In a method for manufacturing a three-dimensional shaped object, when an amount of a shaping material discharged toward a shaping surface per unit movement amount of a discharging unit is defined as a discharged shaping amount, in a layer forming step of forming a layer on the shaping surface, in a case in which a second partial shaped object to be shaped is not adjacent to a first partial shaped object that is shaped previously and is shaped with a gap between the first partial shaped object and the second partial shaped object, the second partial shaped object is shaped by setting the discharged shaping amount to a first discharged shaping amount, and in a case in which the second partial shaped object is adjacent to the first partial shaped object, the second partial shaped object is shaped by setting the discharged shaping amount to a second discharged shaping amount that is greater than the first discharged shaping amount.

9 Claims, 15 Drawing Sheets

(51) Int. Cl.
B33Y 30/00 (2015.01)
B33Y 40/10 (2020.01)
B29C 64/393 (2017.01)
B29C 64/386 (2017.01)
B33Y 50/00 (2015.01)

FIG. 3
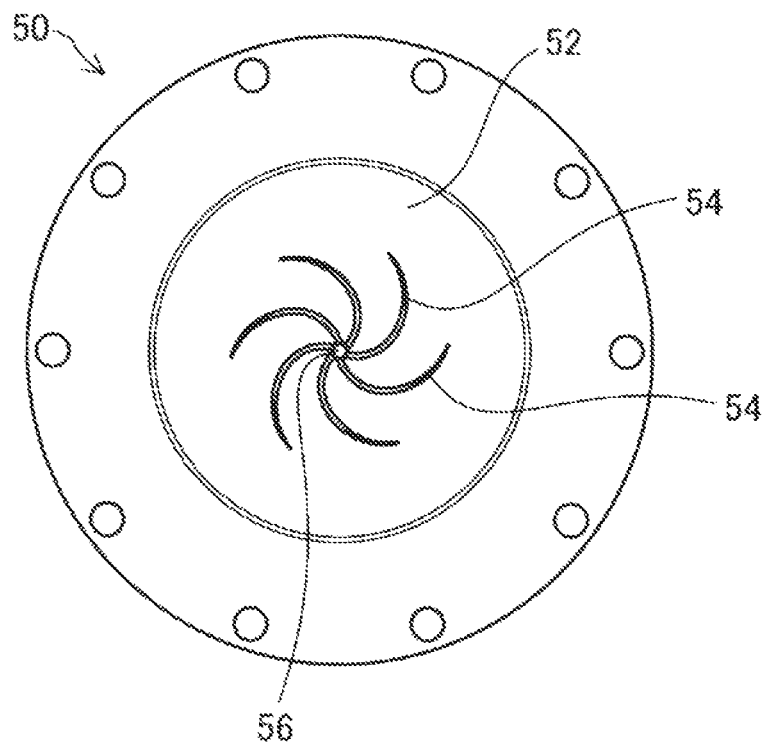
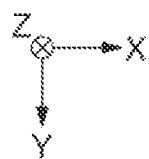

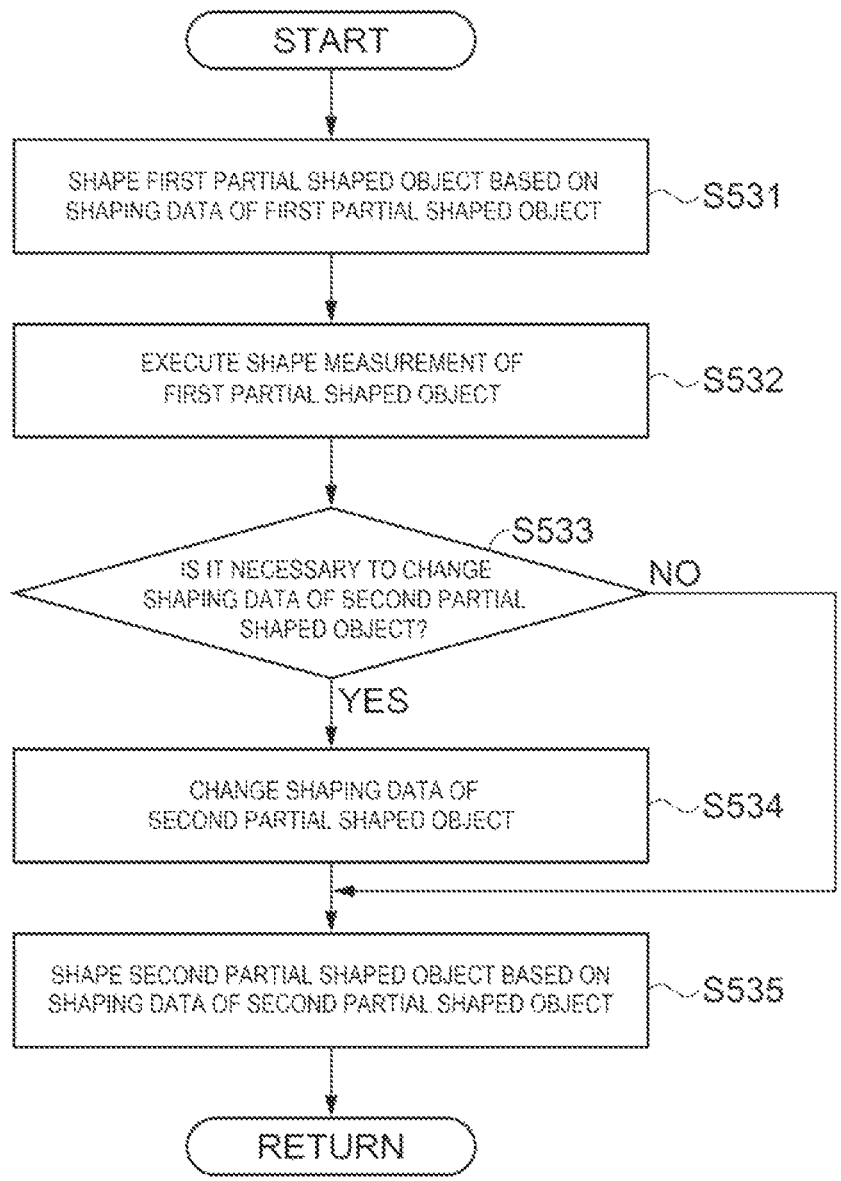

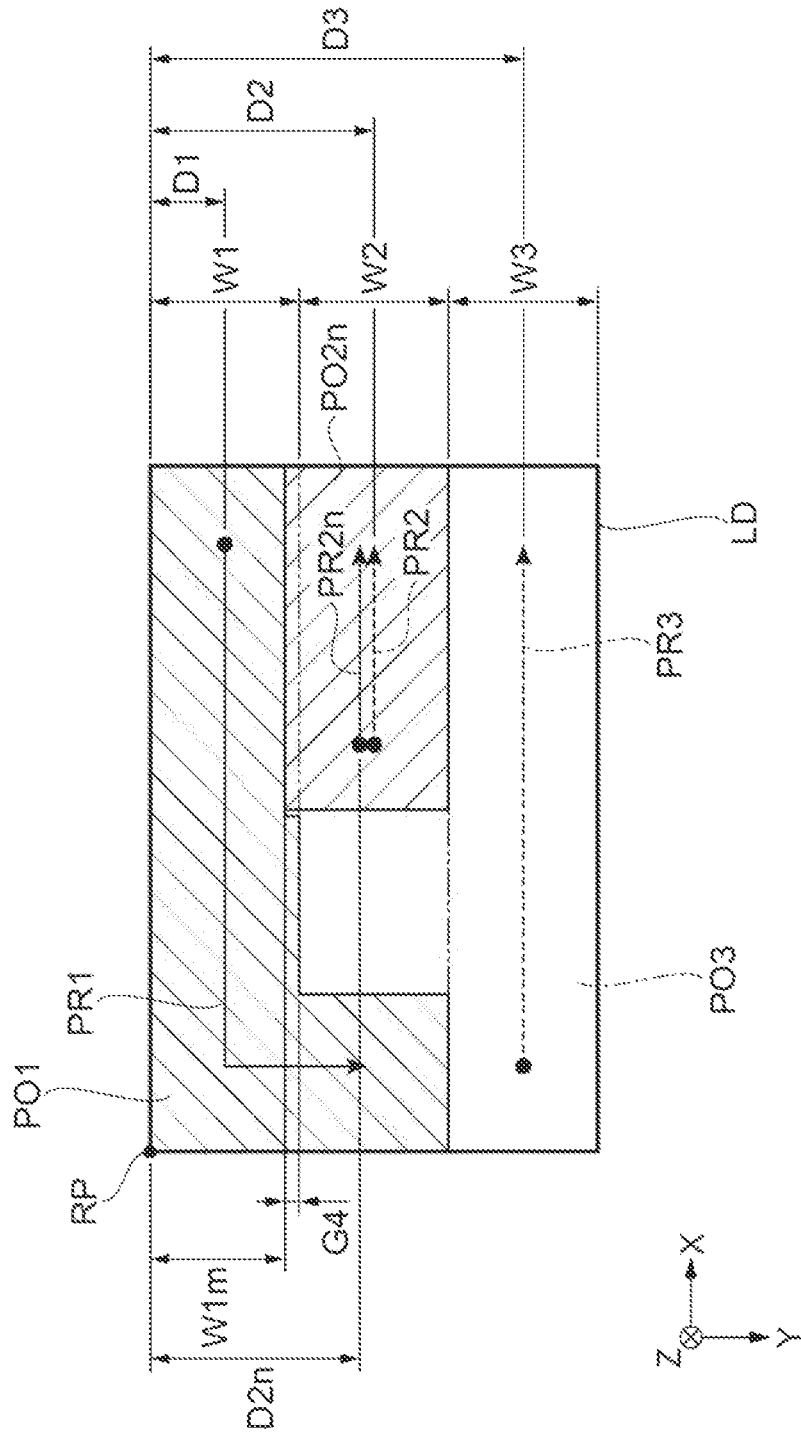

METHOD FOR MANUFACTURING THREE-DIMENSIONAL SHAPED OBJECT AND THREE-DIMENSIONAL SHAPING APPARATUS

The present application is based on, and claims priority from JP Application Serial Number 2021-068182, filed Apr. 14, 2021, the disclosure of which is hereby incorporated by reference herein in its entirety.

BACKGROUND

1. Technical Field

The present disclosure relates to a method for manufacturing a three-dimensional shaped object and a three-dimensional shaping apparatus.

2. Related Art

JP-T-2009-525207 relates to a method for manufacturing a three-dimensional shaped object, and discloses that a nozzle for extruding a shaping material is moved along a build route for constructing layers of the three-dimensional shaped object. The build route includes a peripheral route and a bulk raster route arranged inside the peripheral route.

It is disclosed in the method for manufacturing the three-dimensional shaped object described in JP-T-2009-525207 that a region that is not filled with the bulk raster route is specified as a void region, and an additional remaining route is generated in the void region to prevent a gap. However, it is desirable to perform shaping so as not to generate a gap.

SUMMARY

A method for manufacturing a three-dimensional shaped object is a method for manufacturing a three-dimensional shaped object by discharging a shaping material from a discharging unit toward a shaping surface of a table, the method including: a plasticizing step of plasticizing at least a part of a material to generate the shaping material; and a layer forming step of shaping, based on shaping data, a plurality of partial shaped objects along a partial route to form a layer on the shaping surface, by discharging the shaping material toward the shaping surface while moving the discharging unit along the partial route. When an amount of the shaping material discharged toward the shaping surface per unit movement amount of the discharging unit is defined as a discharged shaping amount, in the layer forming step, in a case in which a second partial shaped object to be shaped along the partial route is not adjacent to a first partial shaped object that is shaped previously and is shaped with a gap between the first partial shaped object and the second partial shaped object, the second partial shaped object is shaped by setting the discharged shaping amount to a first discharged shaping amount, and in a case in which the second partial shaped object is adjacent to the first partial shaped object, the second partial shaped object is shaped by setting the discharged shaping amount to a second discharged shaping amount. The second discharged shaping amount is greater than the first discharged shaping amount when measured under the same condition.

A three-dimensional shaping apparatus includes: a plasticizing unit configured to plasticize at least a part of a material to generate a shaping material; a discharging unit configured to discharge the shaping material toward a shaping surface of a table; a moving mechanism configured to change a relative position between the discharging unit and the shaping surface; and a control unit. The control unit is configured such that a plurality of partial shaped objects are shaped along a plurality of partial routes by causing the discharging unit to discharge the shaping material toward the shaping surface while causing the moving mechanism to change the relative position. The control unit is configured to, when an amount of the shaping material discharged toward the shaping surface per unit movement amount of the discharging unit is defined as a discharged shaping amount, adjust the discharged shaping amount by controlling any one of the plasticizing unit, the discharging unit, and the moving mechanism. When a second partial shaped object to be shaped along the partial route is not adjacent to a first partial shaped object that is shaped previously and is shaped with a gap between the first partial shaped object and the second partial shaped object, the second partial shaped object is shaped by setting the discharged shaping amount to a first discharged shaping amount, and when the second partial shaped object is adjacent to the first partial shaped object, the second partial shaped object is shaped by setting the discharged shaping amount to a second discharged shaping amount that is greater than the first discharged shaping amount when measured under the same condition.

BRIEF DESCRIPTION OF THE DRAWINGS

FIG. 3 is a top view illustrating a configuration of a screw facing surface side of a barrel.

FIG. 15 is a flowchart illustrating a flow of shaping processing of a partial shaped object according to a second embodiment.

FIG. 16 is a plan view illustrating a state in which the second partial shaped object in FIG. 9 is shaped based on changed shaping data.

DESCRIPTION OF EXEMPLARY EMBODIMENTS

Figure 1:
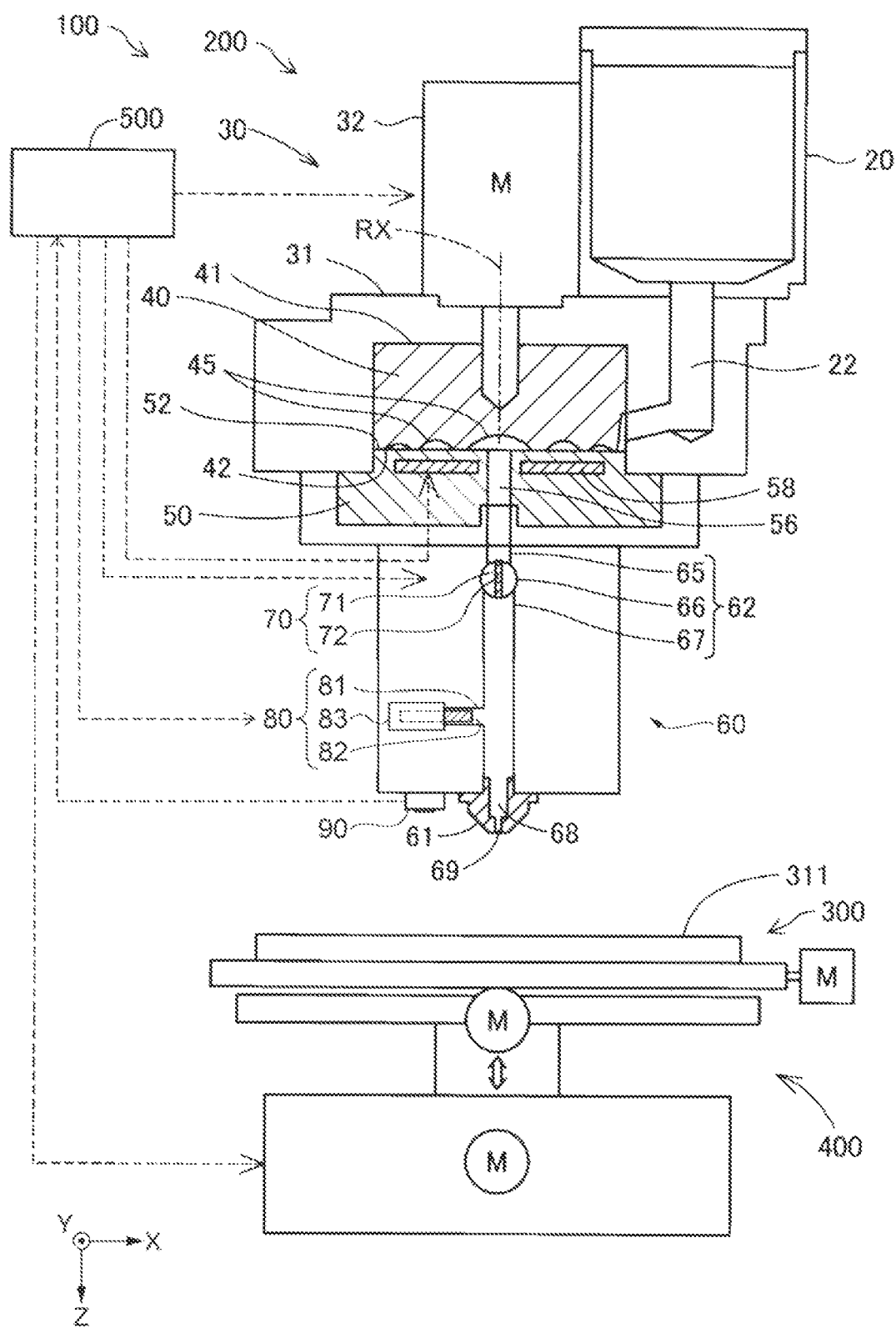
FIG. 1 is a diagram illustrating a schematic configuration of a three-dimensional shaping apparatus according to an embodiment of the present disclosure.

Hereinafter, the present disclosure will be described based on embodiments. In the drawings, the same members are denoted by the same reference numerals, and redundant descriptions thereof will be omitted.

In addition, in the drawings, X, Y, and Z represent three spatial axes orthogonal to each other. In the present description, directions along these axes are defined as an X-axis direction, a Y-axis direction, and a Z-axis direction. The directions are specified by defining a positive direction as "+" and a negative direction as "−". A positive sign and a negative sign are used in combination in the direction notation, directions in which arrows in the drawings are directed are explained as the + directions, and opposite directions of the arrows are explained as the − directions. The X direction and the Y direction are directions along horizontal directions, and the Z direction is a vertical direction. The +Z direction indicates a vertically downward direction, and the −Z direction indicates a vertically upward direction. Further, the three spatial axes of X, Y, and Z, which neither limit the positive direction nor limit the negative direction, will be described as an X axis, a Y axis, and a Z axis.

1. First Embodiment

As illustrated in FIG. 1, in the present embodiment, a three-dimensional shaping apparatus 100 includes a shaping unit 200, a table 300, a moving mechanism 400, and a control unit 500. Under the control of the control unit 500, the three-dimensional shaping apparatus 100 drives the moving mechanism 400 to change a relative position between the table 300 and a discharging unit 60 while discharging a shaping material MM from the discharging unit 60 provided in the shaping unit 200 toward the table 300, so that a three-dimensional shaped object having a desired shape is shaped on a shaping surface 311 of the table 300. The shaping material MM may be referred to as a molten material. The detailed configuration of the shaping unit 200 will be described later.

The moving mechanism 400 changes the relative position between the discharging unit 60 and the shaping surface 311. In the present embodiment, the moving mechanism 400 moves the table 300 with respect to the shaping unit 200 to change the relative position between the discharging unit 60 and the shaping surface 311. The change in the relative position of the discharging unit 60 with respect to the shaping surface 311 may be referred to as movement of the discharging unit 60. A relative moving speed of the discharging unit 60 with respect to the shaping surface 311 may be referred to as a moving speed of the discharging unit 60. In the present embodiment, for example, the movement of the table 300 in a +X direction can be rephrased as the movement of the discharging unit 60 in a −X direction.

The moving mechanism 400 in the present embodiment is a three-axis positioner that moves the table 300 in three axial directions of the X, Y, and Z directions by driving forces of three motors. Each of the motors is driven under the control of the control unit 500. Alternatively, the moving mechanism 400 may be configured to change the relative position between the discharging unit 60 and the shaping surface 311 by moving the shaping unit 200, instead of moving the table 300. Alternatively, the moving mechanism 400 may move both the table 300 and the shaping unit 200 to change the relative position between the discharging unit 60 and the shaping surface 311.

The control unit 500 is configured by a computer including one or more processors, a storage device, and an input and output unit that inputs and outputs a signal to and from an external device. In the present embodiment, the control unit 500 controls operations of the shaping unit 200 and the moving mechanism 400 by causing the processor to execute a program or a command read into the storage device, thereby executing shaping processing for shaping a three-dimensional shaped object. The operations include changing a three-dimensional relative position between the shaping unit 200 and the table 300. Alternatively, the control unit 500 may be a combination of a plurality of circuits instead of a computer. As will be described later, the control unit 500 also functions as a data processing device that processes data for shaping a three-dimensional shaped object. In another embodiment, a data processing device separate from the control unit 500 may be provided.

The shaping unit 200 includes a material supplying unit 20 that is a supply source of a material MR, a plasticizing unit 30 that plasticizes at least a part of the material MR supplied from the material supplying unit 20 to form the shaping material MM, a discharging unit 60 that is provided with a nozzle hole 69 for discharging the shaping material MM supplied from the plasticizing unit 30, a discharge amount adjusting mechanism 70 that adjusts a flow rate of the shaping material MM discharged from the nozzle hole 69, a suction unit 80, and a measurement unit 90.

The material MR in a state of pellets, powder, or the like is contained in the material supplying unit 20. In the present embodiment, for example, a thermoplastic resin formed in a pellet shape is used as the material MR. The material supplying unit 20 according to the present embodiment is a hopper. A coupling path 22 that couples the material supplying unit 20 and the plasticizing unit 30 is provided below the material supplying unit 20. The material supplying unit 20 supplies the material MR to the plasticizing unit 30 via the coupling path 22. The details of the material MR will be described later.

The plasticizing unit 30 includes a screw case 31, a drive motor 32, a flat screw 40, and a barrel 50. The flat screw 40 is an example of a screw. The plasticizing unit 30 plasticizes the material MR in a solid state supplied from the material supplying unit 20 to generate a paste-like shaping material MM exhibiting fluidity, and supplies the shaping material MM to the discharging unit 60.

In the present embodiment, "plasticizing" means that heat is applied to the material MR having thermoplasticity and the material MR is melted. In addition, "melting" not only means that the material MR having thermoplasticity is heated to a temperature equal to or higher than a melting point to be in a liquid state, but also means that the material MR having thermoplasticity is heated to a temperature equal to or higher than a glass transition point to be softened and exhibit fluidity.

The screw case 31 is a housing for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation shaft of the drive motor 32 is coupled to an upper surface 41 side of the flat screw 40. The drive motor 32 is driven under the control of the control unit 500.

The flat screw 40 has a substantially cylindrical shape in which a height in a direction along a central axis RX is smaller than a diameter thereof. The flat screw 40 is disposed in the screw case 31 such that the central axis RX is parallel to the Z axis. The flat screw 40 rotates about the central axis RX in the screw case 31 by a torque generated by the drive motor 32. The flat screw 40 includes a groove forming surface 42, in which grooves 45 are formed, on a side opposite to the upper surface 41 in the direction along the central axis RX. A specific configuration of the groove forming surface 42 side of the flat screw 40 will be described later.

The barrel 50 is disposed below the flat screw 40. The barrel 50 includes a screw facing surface 52 facing the groove forming surface 42 of the flat screw 40. The barrel 50 is provided with a communication hole 56 communicating with the discharging unit 60 on the central axis RX of the flat screw 40. The barrel 50 is incorporated with a heater 58 at a position where the heater 58 faces the grooves 45 of the flat screw 40. A temperature of the heater 58 is controlled by the control unit 500. A specific configuration of the screw facing surface 52 side of the barrel 50 will be described later.

The discharging unit 60 is fixed to a lower surface of the barrel 50. The discharging unit 60 includes a supply flow path 62 and a nozzle 61. The supply flow path 62 couples the plasticizing unit 30 and the nozzle 61, and supplies the shaping material MM from the plasticizing unit 30 to the nozzle 61.

The supply flow path 62 includes a first supply port 65, an intersecting hole 66, and a second supply port 67. The first supply port 65 and the second supply port 67 extend in the Z-axis direction. The intersecting hole 66 extends in the Y-axis direction intersecting the first supply port 65 and the second supply port 67. An upper end of the first supply port 65 is coupled to the communication hole 56 of the barrel 50, and a lower end of the first supply port 65 is coupled to the intersecting hole 66. An upper end of the second supply port 67 is coupled to the intersecting hole 66, and a lower end of the second supply port 67 is coupled to the nozzle 61. The discharge amount adjusting mechanism 70 to be described later is accommodated in the intersecting hole 66. The shaping material MM supplied from the communication hole 56 of the barrel 50 to the first supply port 65 flows through the intersecting hole 66, the second supply port 67, and the nozzle 61 in this order.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a portion in which a flow path cross section provided at an end of the nozzle flow path 68 on a side communicating with the atmosphere is reduced. The shaping material MM supplied from the second supply port 67 to the nozzle flow path 68 is discharged from the nozzle hole 69. In the present embodiment, an opening shape of the nozzle hole 69 is circular. Alternatively, the opening shape of the nozzle hole 69 is not limited to a circular shape, and may be, for example, a quadrangular shape or a polygonal shape other than a quadrangular shape.

The discharge amount adjusting mechanism 70 is provided in the supply flow path 62, and adjusts an amount of the shaping material MM discharged from the nozzle 61. The amount of the shaping material MM discharged from the nozzle 61 per unit time may be referred to as a discharge amount. The discharge amount adjusting mechanism 70 in the present embodiment is configured by a butterfly valve. The discharge amount adjusting mechanism 70 includes a drive shaft 71, which is a shaft-shaped member, and a plate-shaped valve body 72, which rotates together with the rotation of the drive shaft 71. The drive shaft 71 is inserted into the intersecting hole 66 such that the direction along the central axis of the drive shaft 71 intersects with a flow direction of the shaping material MM in the supply flow path 62.

The discharge amount adjusting mechanism 70 functions as a flow rate adjusting mechanism that adjusts the flow rate of the shaping material MM flowing in the supply flow path 62. Specifically, the discharge amount adjusting mechanism 70 adjusts flowability of flow of the shaping material MM flowing in the supply flow path 62 by changing a rotation angle of the valve body 72, thereby adjusting the flow rate of the shaping material MM flowing in the supply flow path 62. The discharge amount is adjusted by adjusting the flow rate of the shaping material MM flowing in the supply flow path 62. The valve body 72 is an example of an adjustment valve.

Increasing the discharge amount by controlling the discharge amount adjusting mechanism 70 may be referred to as opening the discharge amount adjusting mechanism 70. Further, decreasing the discharge amount by controlling the discharge amount adjusting mechanism 70 may be referred to as closing the discharge amount adjusting mechanism 70. A degree of rotation of the valve body 72 may be referred to as an opening degree. When a plate-shaped surface of the valve body 72 is perpendicular to the flow direction of the shaping material MM in the supply flow path 62 by the rotation of the drive shaft 71, the opening degree is 0, the plasticizing unit 30 does not communicate with the nozzle 61, and the discharge of the shaping material MM from the nozzle 61 is stopped. When the plate-shaped surface of the valve body 72 is parallel to the flow direction of the shaping material MM in the supply flow path 62, the opening degree is 100, the plasticizing unit 30 communicates with the nozzle 61, and the shaping material MM is discharged. In this manner, the discharge amount adjusting mechanism 70 also controls start and stop of the discharge of the shaping material MM from the nozzle 61.

The suction unit 80 is capable of sucking the shaping material MM in the supply flow path 62. The suction unit 80 sucks the shaping material MM in the supply flow path 62 to reduce a residual pressure in the supply flow path 62 after the valve body 72 of the discharge amount adjusting mechanism 70 is closed, and to prevent leakage of the shaping material MM from the nozzle 61 in which the discharge of the shaping material MM is stopped. The suction unit 80 includes a cylindrical cylinder 81, a plunger 82 accommodated in the cylinder 81, and a plunger drive unit 83 that drives the plunger 82. The cylinder 81 is coupled to a position between the valve body 72 in the supply flow path 62 and the nozzle hole 69.

In the present embodiment, the plunger drive unit 83 includes a motor that is driven under the control of the control unit 500, and a rack and pinion that converts the rotation of the motor into a movement in a translation direction along the X axis that is the axial direction of the cylinder 81. Alternatively, the plunger drive unit 83 may include a motor that is driven under the control of the control unit 500, and a ball screw that converts the rotation of the motor into a movement in a translation direction along the axial direction of the cylinder 81, or may include an actuator such as a solenoid mechanism or a piezoelectric element.

When the plunger 82 moves in the −X direction away from the supply flow path 62, a pressure in the cylinder 81 becomes negative. Therefore, the shaping material MM in a region between the valve body 72 in the supply flow path 62 and the nozzle hole 69 is sucked toward the inside of the cylinder 81. On the other hand, when the plunger 82 moves in the +X direction approaching the supply flow path 62, the shaping material MM in the cylinder 81 is extruded into the supply flow path 62 by the plunger 82.

The measurement unit 90 measures dimensions of the shaped three-dimensional shaped object. The measurement unit is provided in the vicinity of the nozzle 61. The measurement unit 90 according to the present embodiment includes a measurement light emitting unit in the vicinity of the nozzle 61, and is a non-contact type three-dimensional digitizer that measures the shape of the three-dimensional shaped object using laser light or the like. The measurement unit 90 is not particularly limited as long as it can measure a contour shape of the shaped three-dimensional shaped object as viewed from the −Z direction, and the measurement unit 90 may be fixed in the vicinity of the nozzle 61 or may be provided to be movable to a position away from the discharging unit 60. For example, the measurement unit 90 may include an imaging element in the vicinity of the nozzle 61 to measure the contour shape of the three-dimensional shaped object based on image data of the imaged three-dimensional shaped object.

Figure 2:
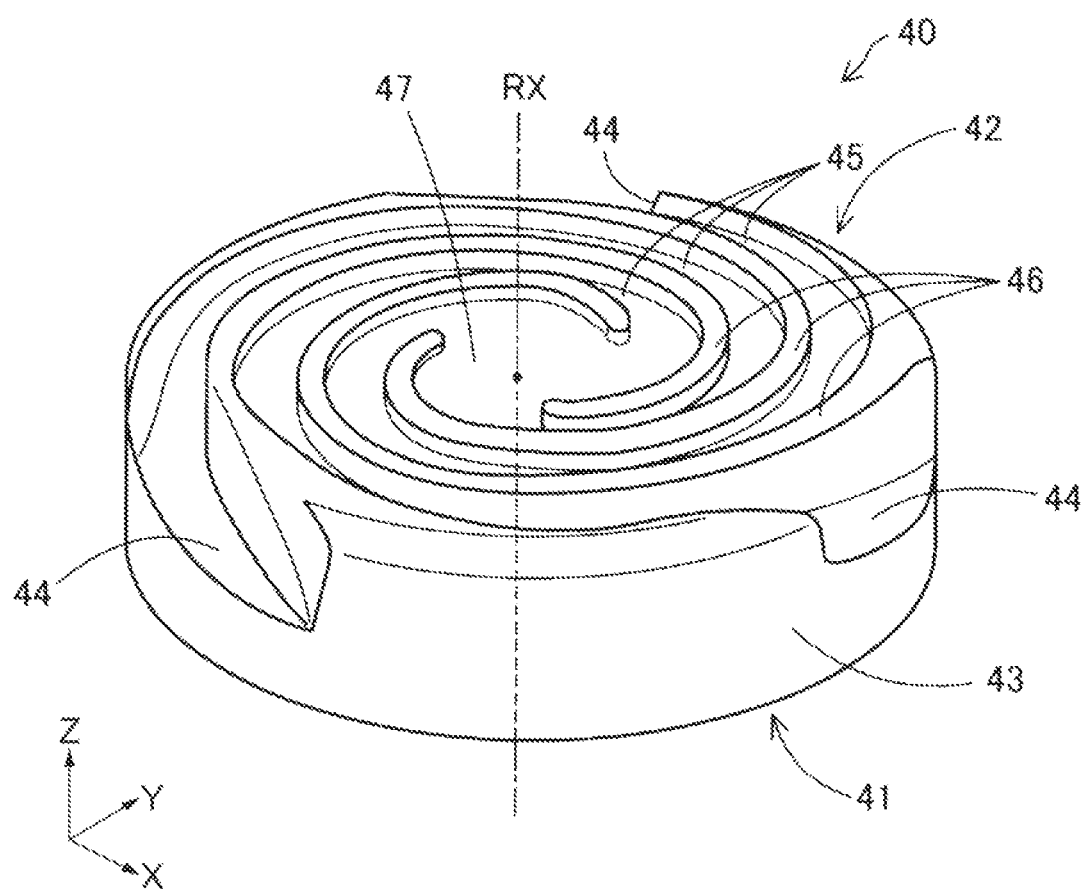
FIG. 2 is a schematic perspective view illustrating a configuration of a groove forming surface side of a flat screw.

FIG. 2 is a schematic perspective view illustrating a configuration of the groove forming surface 42 side of the flat screw 40. In FIG. 2, the position of the center axis RX of the flat screw 40 is indicated by an alternate long and short dashed line. As described with reference to FIG. 1, the grooves 45 are provided in the groove forming surface 42.

A central portion 47 of the groove forming surface 42 of the flat screw 40 is a recess to which one ends of the grooves 45 are coupled. The central portion 47 faces the communication hole 56 of the barrel 50 illustrated in FIG. 1. The central portion 47 intersects the central axis RX.

The grooves 45 of the flat screw 40 are so-called scroll grooves. The grooves 45 extend from the central portion in a vortex shape so as to draw an arc toward an outer periphery of the flat screw 40. The grooves 45 may extend in a spiral shape. The groove forming surface 42 is provided with ridges 46 that constitute side walls of the grooves 45 and that extend along the grooves 45.

The grooves 45 are continuous to material introduction ports 44 formed in a side surface 43 of the flat screw 40. Each of the material introduction ports 44 is a portion that receives the material MR supplied via the coupling path 22 of the material supplying unit 20.

FIG. 2 illustrates an example of the flat screw 40 including three grooves 45 and three ridges 46. The number of the grooves 45 and the ridges 46 provided in the flat screw 40 is not limited to three. The flat screw 40 may be provided with only one groove 45, or may be provided with two or more grooves 45. Alternatively, any number of the ridges 46 may be provided in accordance with the number of the grooves 45.

FIG. 2 illustrates an example of the flat screw 40 provided with three material introduction ports 44. The number of the material introduction port 44 provided in the flat screw 40 is not limited to three. Alternatively, the flat screw 40 may be provided with only one material introduction port 44, or may be provided with two or more material introduction ports 44.

FIG. 3 is a top view illustrating a configuration of the screw facing surface 52 side of the barrel 50. As described above, the communication hole 56 communicating with the discharging unit 60 is formed in a center of the screw facing surface 52. A plurality of guide grooves 54 are formed around the communication hole 56 in the screw facing surface 52. Each of the guide grooves 54 has one end coupled to the communication hole 56 and extends in a spiral shape from the communication hole 56 toward an outer periphery of the screw facing surface 52. Each guide groove 54 has a function of guiding the shaping material MM to the communication hole 56.

In the three-dimensional shaping apparatus 100, as described above, the plasticizing unit 30 plasticizes the material MR in a solid state supplied to the grooves 45 of the rotating flat screw 40 to generate the shaping material MM, and supplies the shaping material MM to the discharging unit 60. A supply amount per unit time of supplying the shaping material MM toward the discharging unit 60 can be changed by adjusting the number of rotations per unit time of the flat screw 40. For example, the supply amount per unit time of the shaping material MM supplied toward the discharging unit 60 increases as the number of rotations per unit time of the flat screw 40 increases.

Figure 4:
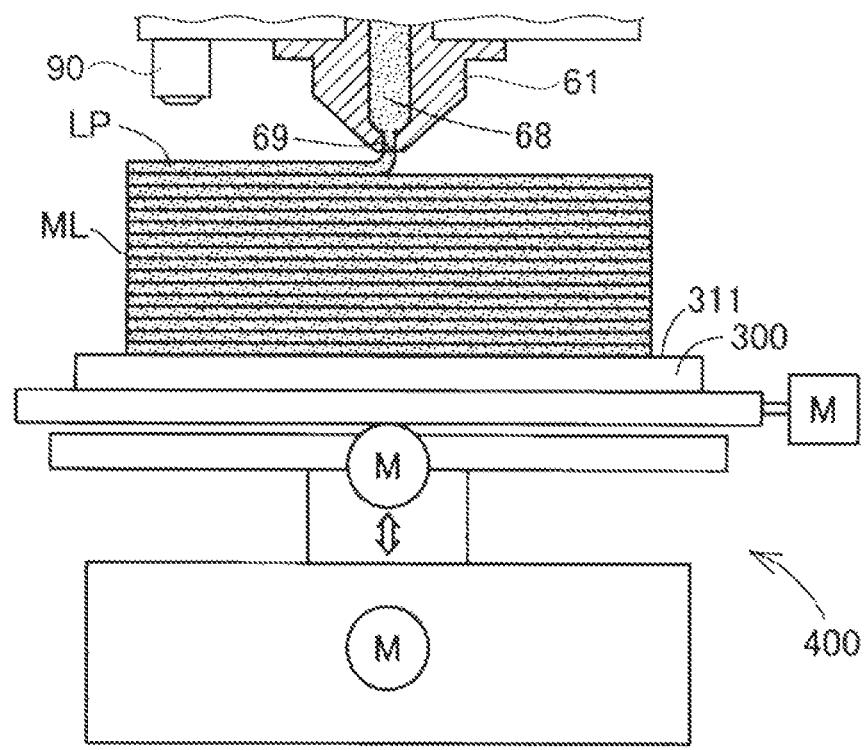
FIG. 4 is a schematic diagram schematically illustrating how to shape a three-dimensional shaped object.

As illustrated in FIG. 4, the control unit 500 discharges the shaping material MM from the nozzle 61 of the discharging unit 60 toward the shaping surface 311 while moving the discharging unit 60. Specifically, the control unit 500 discharges the shaping material MM from the nozzle while moving the nozzle 61 in the direction along the shaping surface 311 while maintaining a distance between the shaping surface 311 and the nozzle 61. The shaping material MM discharged from the nozzle 61 is continuously deposited in a moving direction of the nozzle 61. Accordingly, a linear shaped object LP linearly extending along a movement route of the nozzle 61 is shaped. The movement of the discharging unit 60 while discharging the shaping material MM may be referred to as scanning. A direction of scanning the discharging unit 60 may be referred to as a scanning direction.

The control unit 500 forms a layer ML by repeating the scanning by the above nozzle 61. After forming one layer ML, the control unit 500 causes the nozzle 61 to move in the −Z direction. Thereafter, a three-dimensional shaped object is shaped by further laminating the layer ML on the previously formed layer ML.

Figure 5:
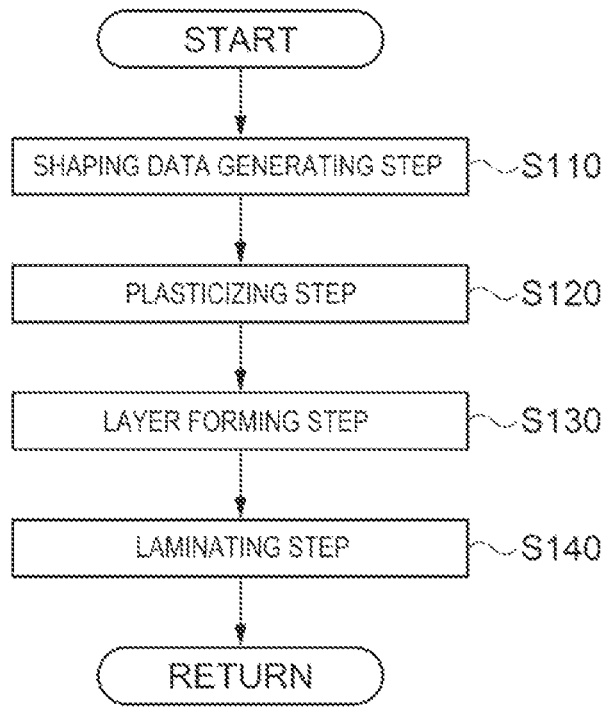
FIG. 5 is a flowchart illustrating a flow of processing when shaping of the three-dimensional shaped object is executed.

Next, with reference to the flowchart illustrated in FIG. 5, a flow of processing when the control unit 500 executes the shaping processing of the three-dimensional shaped object in the present embodiment will be described. In the present embodiment, the flow of the processing when the control unit 500 executes the shaping processing of the three-dimensional shaped object corresponds to a method for manufacturing a three-dimensional shaped object.

When a predetermined start operation is performed by a user on an operation panel provided in the three-dimensional shaping apparatus 100 or an external computer coupled to the three-dimensional shaping apparatus 100, the shaping processing is executed by the control unit 500. By executing the shaping processing, the three-dimensional shaping apparatus 100 starts to manufacture a three-dimensional shaped object.

In the shaping processing, the control unit 500 appropriately controls the shaping unit 200 and the moving mechanism 400 according to the shaping data to laminate the layer of the shaping material MM on the shaping surface 311, so that the three-dimensional shaped object is shaped. Details of the shaping data will be described later.

In step S110, the control unit 500 executes a shaping data generating step. In the shaping data generating step, the control unit 500 analyzes three-dimensional CAD data, which is shape data of a three-dimensional shaped object input from the outside, and generates shaping data. Details of the shaping data generating step will be described later. The shaping data may be generated until the shaping material MM is discharged from the discharging unit 60 toward the shaping surface 311 in a layer forming step to be described later. Therefore, the control unit 500 may execute the shaping data generating step between a plasticizing step to be described later and the layer forming step. Alternatively, the control unit 500 may generate shaping data in the layer forming step, and may discharge the shaping material MM from the discharging unit 60 toward the shaping surface 311 based on the generated shaping data.

In step S120, the control unit 500 executes the plasticizing step. In the plasticizing step, the control unit 500 causes the plasticizing unit 30 to plasticize at least a part of the material MR in a solid state supplied to the grooves 45 of the rotating flat screw 40 to generate the shaping material MM, and supplies the shaping material MM to the discharging unit 60.

In step S130, the control unit 500 executes the layer forming step. In the layer forming step, based on the shaping data, the control unit 500 repeats scanning while discharging the shaping material MM from the discharging unit 60 to form the layer ML of the shaping material MM discharged onto the shaping surface 311.

In step S140, the control unit 500 executes a laminating step. In the laminating step, the control unit 500 causes the nozzle 61 to move in the −Z direction after forming one layer ML, based on the shaping data. Thereafter, the layer ML is further laminated on the previously formed layer ML to shape the three-dimensional shaped object.

After executing the processing of step S140, the control unit 500 ends the processing of executing the shaping processing of the three-dimensional shaped object.

Figure 6:
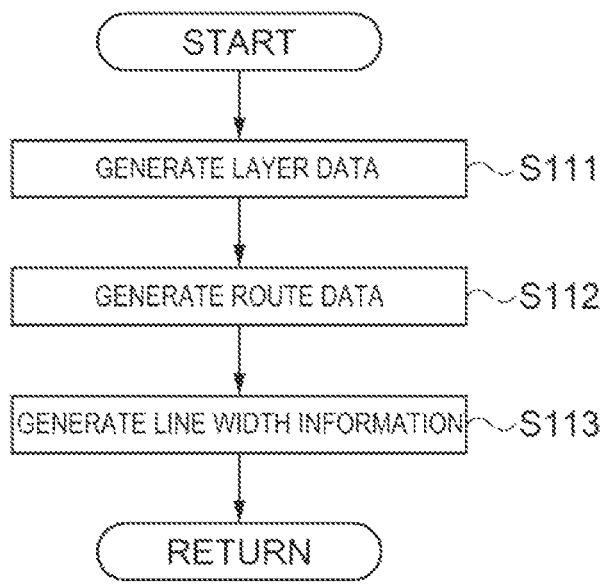
FIG. 6 is a flowchart illustrating a flow of processing of generating shaping data.

Next, a flow of processing when the control unit 500 executes the shaping data generating step in the present embodiment will be described with reference to a flowchart illustrated in FIG. 6. In step S111, the control unit 500 executes generating processing of layer data. In step S111, the control unit 500 analyzes the three-dimensional CAD data and generates the layer data obtained by slicing the three-dimensional shaped object into a plurality of layers along the XY plane.

After executing the processing of step S111, the control unit 500 executes generating processing of route data in step S112. In step S112, the control unit 500 generates a partial route PR. The partial route PR refers to a route along which the discharging unit 60 moves while discharging the shaping material MM in order to shape a partial shaped object PO on the shaping surface 311. The partial shaped object PO is a part of the linear shaped object LP. The partial route PR is, for example, a linear route. In the present embodiment, in step S112, the control unit 500 generates route data including a plurality of partial routes PR based on an outer shell shape of the three-dimensional shaped object. The change in the relative position of the discharging unit 60 with respect to the shaping surface 311 may be referred to as movement of the discharging unit 60. Accordingly, the relative movement of the discharging unit 60 with respect to the shaping surface 311 while discharging the shaping material MM by moving the table 300 may be referred to as the movement of the discharging unit 60 while discharging the shaping material MM.

After executing the processing of step S112, the control unit 500 determines a line width W in the partial route PR in step S113. The line width W refers to a width of the shaping material MM discharged to the shaping surface 311 in a direction intersecting the scanning direction. In the present embodiment, the control unit 500 generates line width information in step S113. The line width information is information for discharging the shaping material MM having the determined line width W in each partial route PR. That is, the line width information is information for achieving the determined line width W.

In the present embodiment, the line width information includes the line width W, discharge amount information, and moving speed information. The discharge amount information is information indicating the discharge amount of the shaping material MM in each partial route PR. The moving speed information is information indicating the moving speed at which the discharging unit 60 moves while discharging the shaping material MM in each partial route PR. The relative moving speed of the discharging unit 60 with respect to the shaping surface 311 when the discharging unit moves relatively to the shaping surface 311 while discharging the shaping material MM by moving the table 300 may be referred to as a moving speed at which the discharging unit 60 moves while discharging the shaping material MM. The control unit 500 determines the line width W in each generated partial route PR, and generates the shaping data in one layer ML. The shaping data in one layer ML is data including the route data and the line width information. The control unit 500 generates the shaping data for all layers. Details of the line width W and the line width information will be described later.

After executing the processing of step S113, the control unit 500 ends the processing of executing the shaping data generating step.

Figure 7:
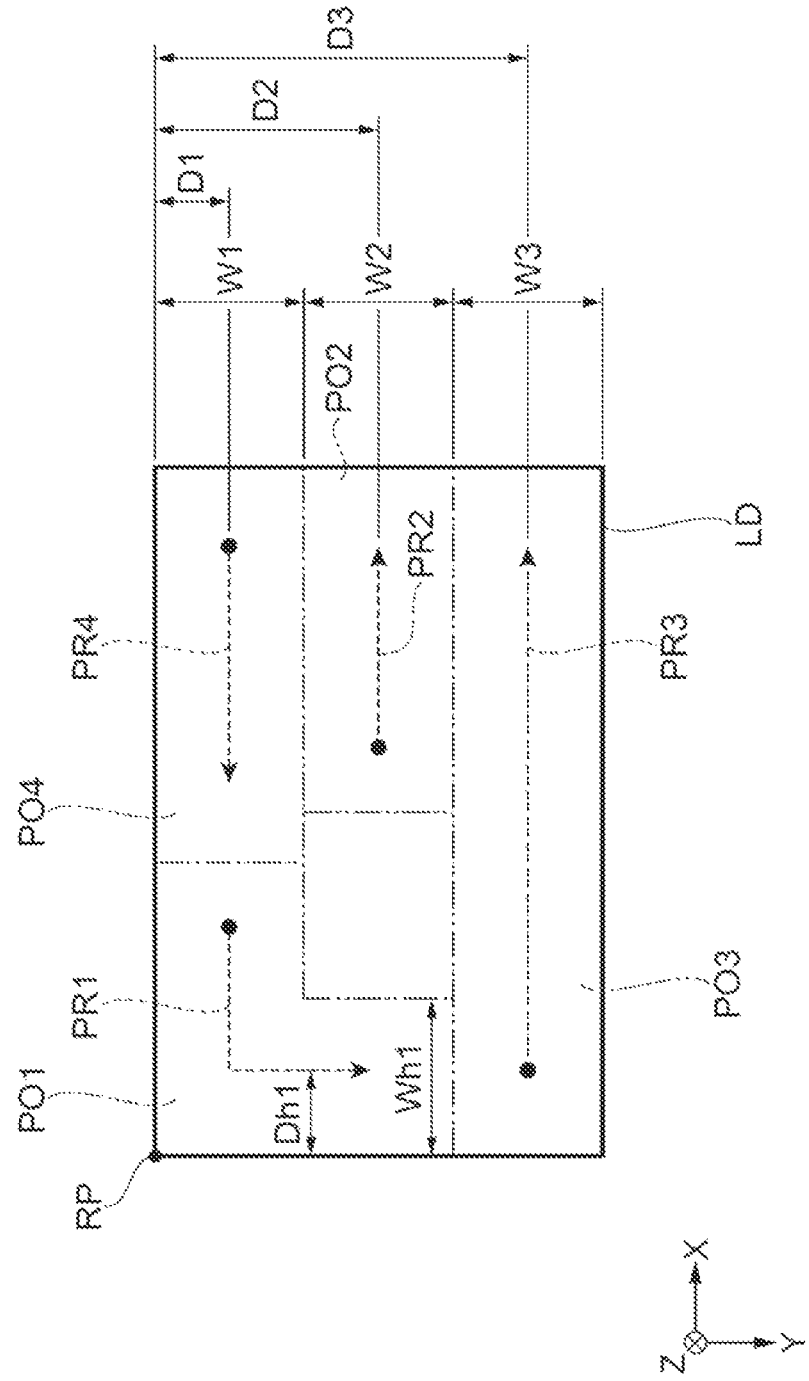
FIG. 7 is a plan view illustrating an arrangement example of a partial shaped object for forming one layer.
Figure 8:
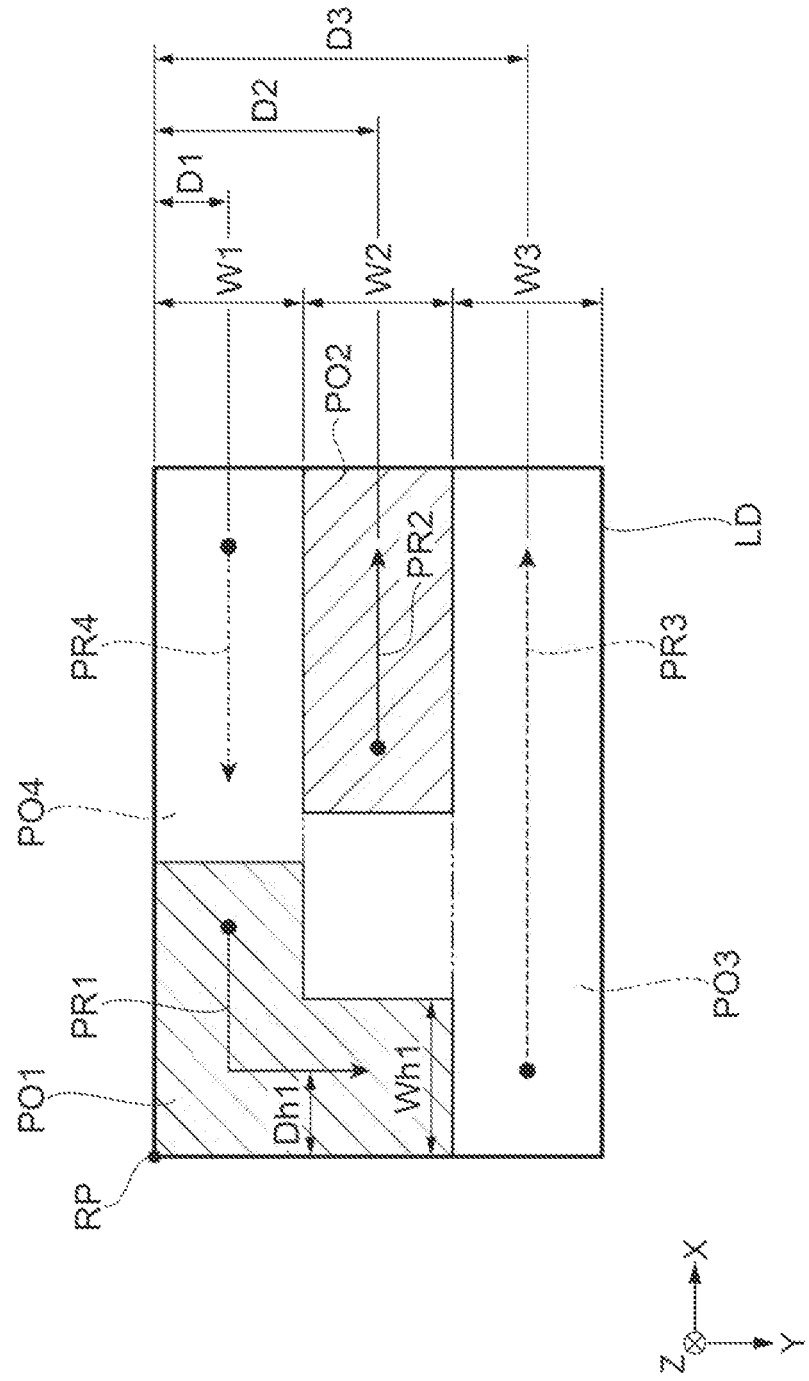
FIG. 8 is a plan view illustrating a state in which a second partial shaped object that is not adjacent to a first partial shaped object is shaped based on the shaping data.

Next, details of the generation of the shaping data in the shaping data generating step and the formation of the layer ML in the layer forming step described above will be described with reference to FIGS. 7 and 8. In FIGS. 7 and 8, contours and the line widths W of the partial shaped objects PO in the shaping data are indicated by a two-dot chain line, the partial routes PR in the shaping data are indicated by a dashed line, the partial shaped objects PO shaped based on the shaping data are indicated by hatching, and the partial routes PR used for shaping the partial shaped object PO are indicated by a solid line. An outline shape LD of the shaped object in the layer ML is indicated by a thick solid line.

FIG. 7 illustrates an example of the shaping data generated for forming one layer ML in the shaping data generating step. In the shaping data illustrated in FIG. 7, one layer ML is formed by shaping a first partial shaped object PO1, a second partial shaped object PO2, a third partial shaped object PO3, and a fourth partial shaped object PO4 in this order. The first partial shaped object PO1 is an example of the partial shaped object PO to be shaped before the second partial shaped object PO2. In the shaping data illustrated in FIG. 7, the first partial shaped object PO1 is defined by a partial route PR1, line widths W1 and Wh1, and distances D1 and Dh1, the second partial shaped object PO2 is defined by a partial route PR2, a line width W2, and a distance D2, the third partial shaped object PO3 is defined by a partial route PR3, a line width W3, and a distance D3, and the fourth partial shaped object PO4 is defined by a partial route PR4, the line width W1, and the distance D1.

In FIG. 8, among the shaping data illustrated in FIG. 7, the first partial shaped object PO1 shaped based on the shaping data of the first partial shaped object PO1 and the second partial shaped object PO2 shaped based on the shaping data of the second partial shaped object PO2 after the first partial shaped object PO1 is shaped are indicated by hatching. In the layer forming step, the control unit 500 discharges the shaping material MM from the nozzle 61 of the discharging unit 60 to the shaping surface 311 so as to have the line widths W1 and Wh1 of the first partial shaped object PO1 while moving the discharging unit 60 along the partial route PR1 based on the shaping data of the first partial shaped object PO1.

After shaping the first partial shaped object PO1, the control unit 500 discharges the shaping material MM from the nozzle 61 of the discharging unit 60 to the shaping surface 311 so as to have the line width W2 of the second partial shaped object PO2 while moving the discharging unit 60 along the partial route PR2 based on the shaping data of the second partial shaped object PO2. As illustrated in FIG. 7, when one layer ML is formed by the third partial shaped object PO3 and the fourth partial shaped object PO4 in addition to the first partial shaped object PO1 and the second partial shaped object PO2, the control unit 500 forms one layer ML by shaping the third partial shaped object PO3 and the fourth partial shaped object PO4 in the same manner after shaping the second partial shaped object PO2.

In the present embodiment, the control unit 500 controls the shaping unit 200 and the moving mechanism 400 such that the line width W of the shaping material MM discharged from the nozzle 61 of the discharging unit 60 to the shaping surface 311 is the line width W of the partial shaped object PO determined in the shaping data generating step.

In the present embodiment, when the line width W is changed, the control unit 500 changes the discharge amount of the shaping material MM, the moving speed of the discharging unit 60, or both. Due to the change in the discharge amount or the moving speed, the amount of the shaping material MM discharged to the shaping surface 311 per unit movement amount along the shaping surface 311 of the discharging unit 60 changes, and the line width W changes. Hereinafter, when the control unit 500 discharges the shaping material MM toward the shaping surface 311 while moving the discharging unit 60 along the partial route PR, the amount of the shaping material MM discharged to the shaping surface 311 per unit movement amount of the discharging unit 60 may be referred to as a discharged shaping amount MA. The control unit 500 determines the line width information for achieving the desired line width W by, for example, calculating the discharge amount and the moving speed for discharging the shaping material MM with the desired line width W in the partial route PR. In addition, for example, the control unit 500 stores, in a storage device, data related to the relation between the discharge amount of the shaping material MM and the line width W and the relation between the moving speed of the discharging unit 60 and the line width W acquired in advance by an experiment or the like, as data MAD, and determines the line width information for achieving a desired line width based on the data MAD.

For example, when the line width W is the line width W1 greater than a line width Wn, the control unit 500 increases the discharged shaping amount MA by executing at least one of increasing the discharge amount of the shaping material MM when the line width W is controlled to be the line width Wn and decreasing the moving speed of the discharging unit 60 when the line width W is controlled to be the line width Wn. When the discharge amount of the shaping material MM is increased, the control unit 500 increases the discharged shaping amount MA by executing at least one of increasing the number of rotations per unit time of the flat screw 40 of the plasticizing unit 30 and increasing the opening degree of the valve body 72 of the discharge amount adjusting mechanism 70. Accordingly, the discharge amount information according to the present embodiment includes the number of rotations per unit time of the flat screw 40 of the plasticizing unit 30 and the opening degree of the valve body 72 of the discharge amount adjusting mechanism 70. Therefore, in order to achieve the desired line width W, the change in at least one of the number of rotations of the flat screw 40 per unit time and the opening degree of the valve body 72 by the control unit 500 may be referred to as the change in the discharge amount of the shaping material MM. In addition, in order to achieve the desired line width W, the change in at least one of the discharge amount of the shaping material MM and the moving speed of the discharging unit 60 by the control unit 500 may be referred to as the change in the discharged shaping amount MA. In addition, for example, the setting of the discharge amount and the moving speed of the discharging unit 60 by the control unit 500 such that the discharged shaping amount MA is a first discharged shaping amount MA1 may be referred to as setting of the discharged shaping amount MA to the first discharged shaping amount MA1.

On the other hand, the inventor of the present application has found that the line width W of the shaped second partial shaped object PO2 is different between a case in which the second partial shaped object PO2 to be shaped is adjacent to the first partial shaped object PO1 that is shaped previously and a case in which the second partial shaped object PO2 to be shaped is not adjacent to the first partial shaped object PO1 that is shaped previously, even when the discharged shaping amount MA is the same. The expression that the second partial shaped object PO2 is adjacent to the first partial shaped object PO1 means that at least a part of the second partial shaped object PO2 is adjacent to and in contact with the first partial shaped object PO1. Specifically, the line width W2 of the shaped second partial shaped object PO2 when the second partial shaped object PO2 to be shaped is adjacent to the first partial shaped object PO1 that is shaped previously is smaller than that when the second partial shaped object PO2 is not adjacent to the first partial shaped object PO1. It is considered that this is because the first partial shaped object PO1 that is shaped previously is the resistance to the flow of the shaping material MM discharged from the discharging unit 60, and thus the discharge amount at the time of shaping the second partial shaped object PO2 is smaller than the discharge amount in the shaping data.

For example, as in the shaping data illustrated in FIG. 7, when the second partial shaped object PO2 that is not adjacent to the first partial shaped object PO1 shaped previously is shaped with the first discharged shaping amount MA1, it is assumed that the line width W of the shaped second partial shaped object PO2 is the line width W2 of the second partial shaped object PO2 in the shaping data, as illustrated by hatching in FIG. 8. In this case, as in the shaping data illustrated in FIG. 9, when the second partial shaped object PO2 that is adjacent to, on one side, the contour on the −Y direction side of the first partial shaped object PO1 shaped previously is shaped with the first discharged shaping amount MA1, the line width W of the shaped second partial shaped object PO2 is a line width W2e smaller than the line width W2 of the second partial shaped object PO2 in the shaping data, as illustrated by hatching in FIG. 9.

Figure 9:
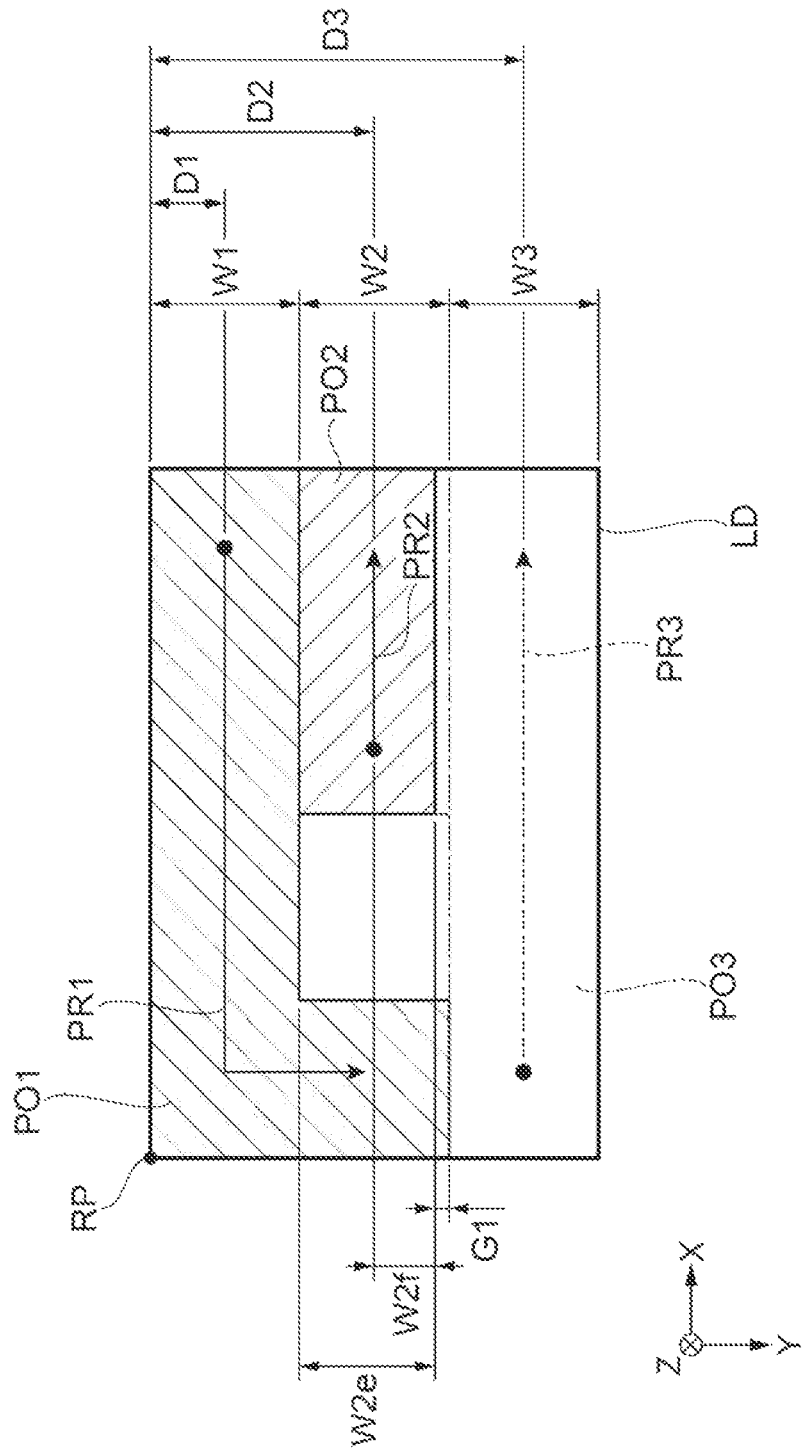
FIG. 9 is a plan view illustrating a state in which the second partial shaped object that is adjacent to the first partial shaped object is shaped based on the shaping data.

At this time, as illustrated in FIG. 9, a distance W2f between the contour of the shaped second partial shaped object PO2 on the +Y direction side and the partial route PR2 of the second partial shaped object PO2 is smaller than half of the line width W2 of the second partial shaped object PO2 in the shaping data, so that the line width W of the shaped second partial shaped object PO2 is the line width W2e smaller than the line width W2 of the second partial shaped object PO2 in the shaping data. Therefore, in the state illustrated in FIG. 9, when the third partial shaped object PO3 is shaped based on the shaping data, a gap G1 is generated between the second partial shaped object PO2 and the third partial shaped object PO3. As a result, a gap may be generated in the three-dimensional shaped object.

Figure 10:
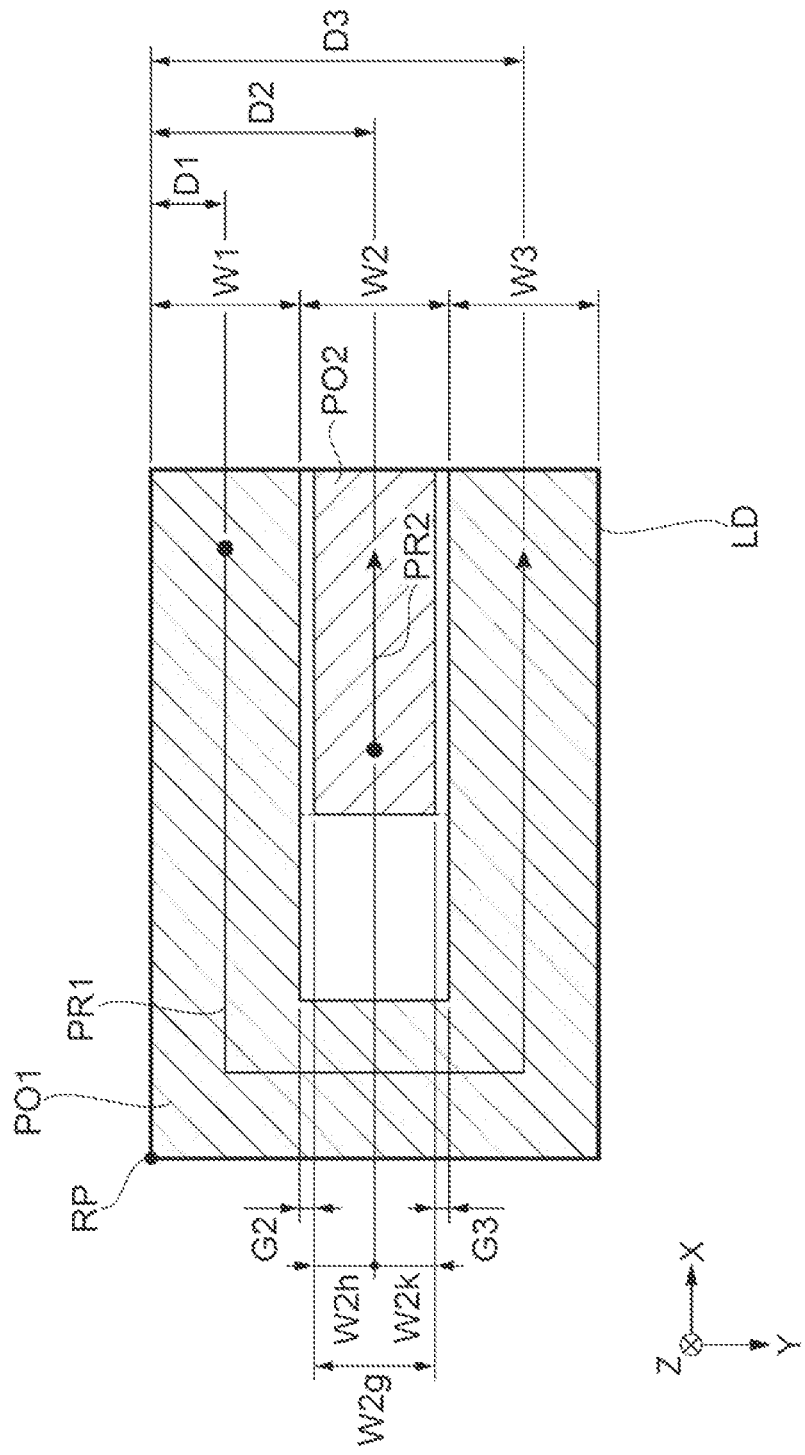
FIG. 10 is a plan view illustrating a state in which the second partial shaped object that is adjacent to the first partial shaped object on both sides is shaped based on the shaping data.

In addition, as in the shaping data illustrated in FIG. 10, when the second partial shaped object PO2 that is adjacent to the contour of the first partial shaped object PO1 that is shaped previously in the Y-axis direction on both sides is shaped with the first discharged shaping amount MA1, the line width W of the shaped second partial shaped object PO2 is a line width W2g smaller than the line width W2 of the second partial shaped object PO2 in the shaping data, as illustrated by hatching in FIG. 10. The line width W2g is smaller than the line width W2e.

At this time, as illustrated in FIG. 10, a distance W2h between the position of the contour of the shaped second partial shaped object PO2 on the −Y direction side and the partial route PR2 of the second partial shaped object PO2 is smaller than half of the line width W2 of the second partial shaped object PO2 in the shaping data. Therefore, a gap G2 is formed between the contour of the second partial shaped object PO2 on the −Y direction side and the first partial shaped object PO1. As a result, a gap may be generated in the three-dimensional shaped object.

A distance W2k between the position of the contour of the shaped second partial shaped object PO2 on the +Y direction side and the partial route PR2 of the second partial shaped object PO2 is smaller than half of the line width W2 of the second partial shaped object PO2 in the shaping data. Therefore, a gap G3 is formed between the contour of the second partial shaped object PO2 on the +Y direction side and the first partial shaped object PO1. As a result, a gap may be generated in the three-dimensional shaped object.

In the present embodiment, the discharged shaping amount MA at the time of shaping the second partial shaped object PO2 is changed between the case in which the second partial shaped object PO2 to be shaped is adjacent to the first partial shaped object PO1 that is shaped previously and the case in which the second partial shaped object PO2 to be shaped is not adjacent to the first partial shaped object PO1 that is shaped previously. In other words, the method for manufacturing a three-dimensional shaped object includes, in the shaping data generating step, a determining step of determining whether the second partial shaped object PO2 is adjacent to the first partial shaped object PO1 that is shaped previously, and the discharged shaping amount MA at the time of shaping the second partial shaped object PO2 is changed between the case in which the second partial shaped object PO2 to be shaped is adjacent to the first partial shaped object PO1 that is shaped previously and the case in which the second partial shaped object PO2 to be shaped is not adjacent to the first partial shaped object PO1 that is shaped previously. In the present embodiment, the control unit 500 acquires data related to the relation between the discharge amount of the shaping material MM and the line width W and the relation between the moving speed of the discharging unit 60 and the line width W in advance by experiments or the like in the case in which the partial shaped object PO to be shaped is adjacent to the previously shaped partial shaped object PO and the case in which the partial shaped object PO to be shaped is not adjacent to the previously shaped partial shaped object PO, and stores the data in the storage device as the data MAD. The control unit 500 determines the discharged shaping amount MA for achieving the desired line width W based on the data MAD.

Specifically, according to the arrangement of the partial shaped object PO in the shaping data, when the second partial shaped object PO2 to be shaped along the partial route PR2 is not adjacent to the first partial shaped object PO1 that is shaped previously and is shaped with a gap between the first partial shaped object and the second partial shaped object, the second partial shaped object PO2 is shaped by setting the discharged shaping amount MA to the first discharged shaping amount MA1. The first discharged shaping amount MA1 is a discharged shaping amount MA at which the line width W of the shaped second partial shaped object PO2 is the line width W2 of the second partial shaped object PO2 in the shaping data when the second partial shaped object PO2 is not adjacent to the first partial shaped object PO1 that is shaped previously.

Figure 12:
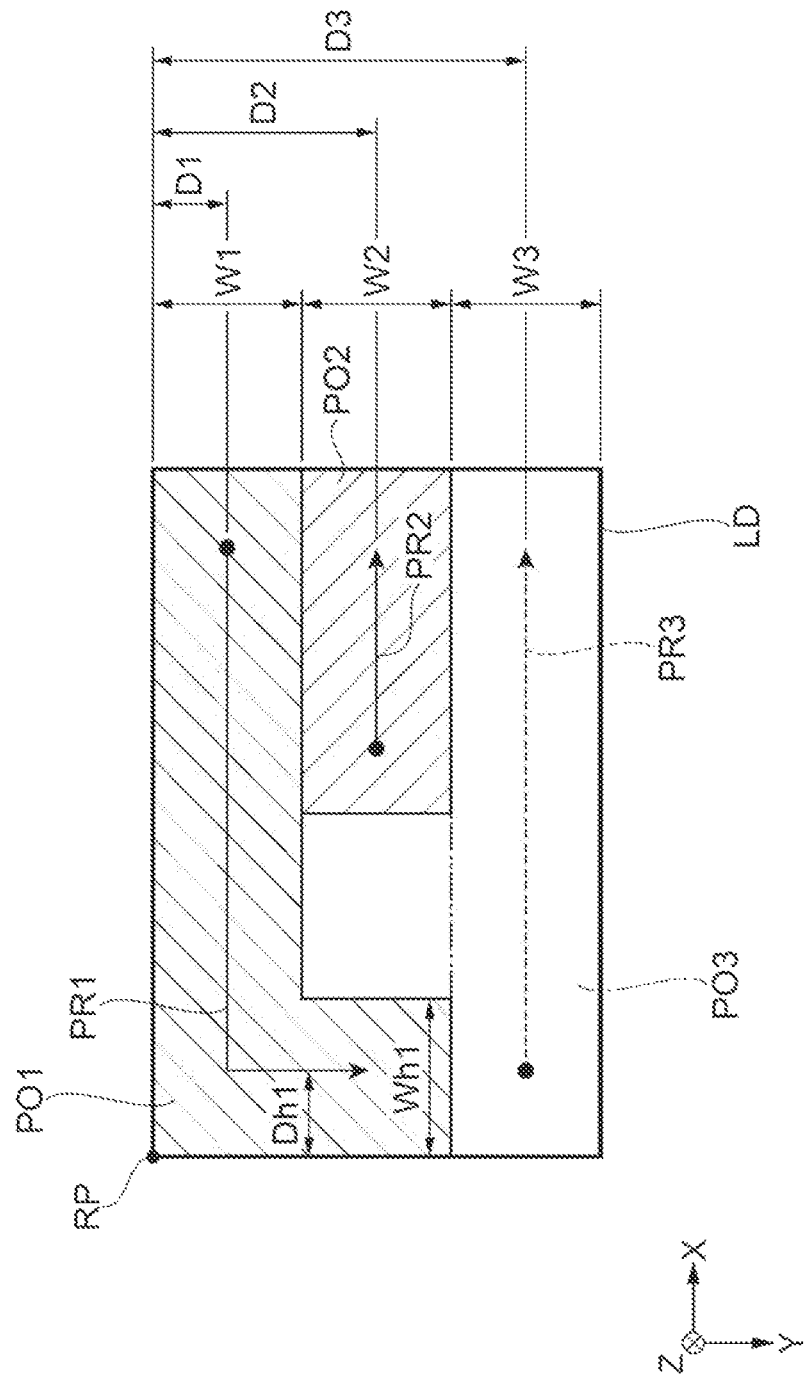
FIG. 12 is a plan view illustrating a state in which the second partial shaped object in FIG. 9 is shaped with a second discharged shaping amount.

When the second partial shaped object PO2 is adjacent to, on one side, the first partial shaped object PO1, the second partial shaped object PO2 is shaped by setting the discharged shaping amount MA to the second discharged shaping amount MA2. The second discharged shaping amount MA2 is greater than the first discharged shaping amount MA1 when measured under the same condition. The second discharged shaping amount MA2 is, when the second partial shaped object PO2 is adjacent to, on one side, the first partial shaped object PO1 that is shaped previously, a discharged shaping amount MA at which the line width W of the shaped second partial shaped object PO2 is the line width W2 of the second partial shaped object PO2 in the shaping data. Accordingly, even when the second partial shaped object PO2 is adjacent to, on one side, the first partial shaped object PO1, the second partial shaped object PO2 is shaped by setting the discharged shaping amount MA to the second discharged shaping amount MA2, and thus it is possible to prevent the generation of a gap between the second partial shaped object PO2 and the first partial shaped object PO1 and a gap between the second partial shaped object PO2 and the third partial shaped object PO3 to be shaped after the second partial shaped object PO2 as illustrated in FIG. 12.

Figure 13:
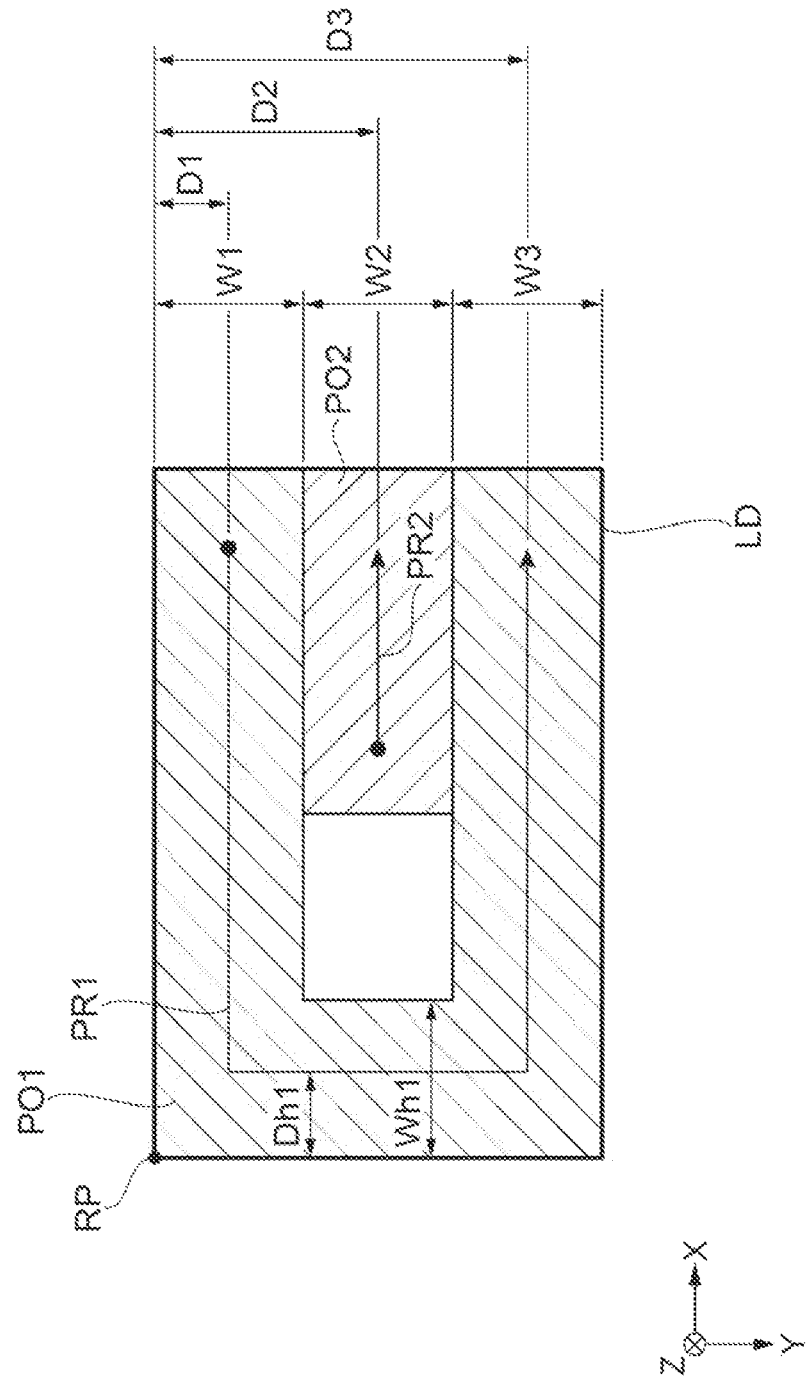
FIG. 13 is a plan view illustrating a state in which the second partial shaped object in FIG. 10 is shaped with a third discharged shaping amount.

When the second partial shaped object PO2 is, on both sides, adjacent to the first partial shaped object PO1, the second partial shaped object PO2 is shaped by setting the discharged shaping amount MA to a third discharged shaping amount MA3. The third discharged shaping amount MA3 is greater than the second discharged shaping amount MA2 when measured under the same condition. The third discharged shaping amount MA3 is, when the second partial shaped object PO2 is adjacent to, on both sides, the first partial shaped object PO1 that is shaped previously, a discharged shaping amount MA at which the line width W of the shaped second partial shaped object PO2 is the line width W2 of the second partial shaped object PO2 in the shaping data. Accordingly, even when the second partial shaped object PO2 is adjacent to, on both sides, the first partial shaped object PO1, the second partial shaped object PO2 is shaped by setting the discharged shaping amount MA to the third discharged shaping amount MA3, and thus it is possible to prevent the generation of a gap between the second partial shaped object PO2 and the first partial shaped object PO1 as illustrated in FIG. 13.

Figure 11:
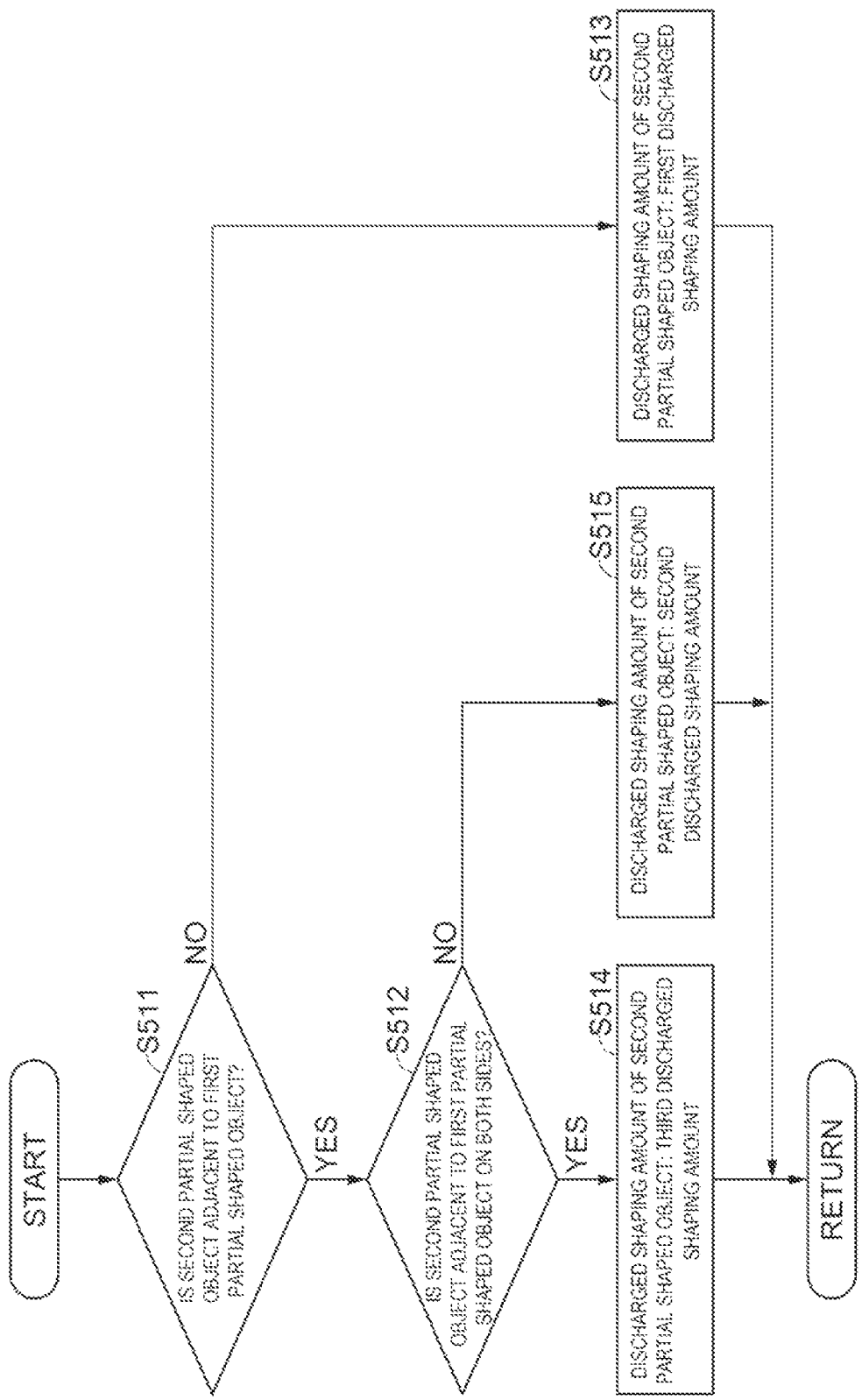
FIG. 11 is a flowchart illustrating a flow of processing of determining, based on a result of a determining step, a discharged shaping amount at the time of shaping a partial shaped object.

Next, a flow of processing of determining, based on the result of the above determining step, the discharged shaping amount MA at the time of shaping the second partial shaped object PO2 will be described with reference to a flowchart illustrated in FIG. 11.

In step S511, as a determining step, the control unit 500 determines whether the second partial shaped object PO2 is adjacent to the first partial shaped object PO1. In step S511, when the second partial shaped object PO2 is not adjacent to the first partial shaped object PO1, the determination in step S511 is NO. The control unit 500 causes the processing to proceed to step S513.

In step S513, the control unit 500 sets the discharged shaping amount MA at the time of shaping the second partial shaped object PO2 to the first discharged shaping amount MA1.

In step S511, when the second partial shaped object PO2 is adjacent to the first partial shaped object PO1, the determination in step S511 is YES. The control unit 500 causes the processing to proceed to step S512.

In step S512, as a determining step, the control unit 500 determines whether the second partial shaped object PO2 is adjacent to, on both sides, the first partial shaped object PO1. In step S512, when the second partial shaped object PO2 is adjacent to, on one side, the first partial shaped object PO1 and is not adjacent to, on both sides, the first partial shaped object PO1, the determination in step S512 is NO. The control unit 500 causes the processing to proceed to step S515.

In step S515, the control unit 500 sets the discharged shaping amount MA at the time of shaping the second partial shaped object PO2 to the second discharged shaping amount MA2 that is greater than the first discharged shaping amount MA1.

In step S512, when the second partial shaped object PO2 is adjacent to, on both sides, the first partial shaped object PO1, the determination in step S512 is YES. The control unit 500 causes the processing to proceed to step S514.

In step S514, the control unit 500 sets the discharged shaping amount MA at the time of shaping the second partial shaped object PO2 to the third discharged shaping amount MA3 that is greater than the first discharged shaping amount MA1 and the second discharged shaping amount MA2.

After setting the discharged shaping amount MA at the time of shaping the second partial shaped object PO2, the control unit 500 ends the processing of determining the discharged shaping amount MA at the time of shaping the second partial shaped object PO2 based on the result of the determining step.

As described above, according to the method for manufacturing a three-dimensional shaped object and the three-dimensional shaping apparatus 100 according to the first embodiment, the following effects can be exerted.

The method for manufacturing a three-dimensional shaped object is directed to a method for manufacturing a three-dimensional shaped object by discharging the shaping material MM toward the shaping surface 311 of the table 300 from the discharging unit 60, and the method includes a plasticizing step of plasticizing at least a part of the material MR to generate the shaping material MM, and a layer forming step of shaping, based on the shaping data, a plurality of partial shaped objects PO along the partial route PR to form the layer ML on the shaping surface 311, by discharging the shaping material MM toward the shaping surface 311 while moving the discharging unit 60 along the partial route PR. When the amount of the shaping material MM discharged toward the shaping surface 311 per unit movement amount of the discharging unit 60 is defined as the discharged shaping amount MA, in the layer forming step, in a case in which the second partial shaped object PO2 to be shaped along the partial route PR2 is not adjacent to the first partial shaped object PO1 that is shaped previously and is shaped with a gap between the first partial shaped object and the second partial shaped object, the second partial shaped object PO2 is shaped by setting the discharged shaping amount MA to the first discharged shaping amount MA1, and in a case in which the second partial shaped object PO2 is adjacent to the first partial shaped object PO1, the second partial shaped object PO2 is shaped by setting the discharged shaping amount MA to the second discharged shaping amount MA2. The second discharged shaping amount MA2 is greater than the first discharged shaping amount MA1 when measured under the same condition. Accordingly, the second partial shaped object PO2 is shaped by changing the discharged shaping amount MA at the time of shaping the second partial shaped object PO2 between the case in which the second partial shaped object PO2 is adjacent to the first partial shaped object PO1 and the case in which the second partial shaped object PO2 is not adjacent to the first partial shaped object PO1, and thus it is possible to prevent the generation of a gap in the three-dimensional shaped object.

In the method for manufacturing a three-dimensional shaped object, in the layer forming step, when the second partial shaped object PO2 is adjacent to, on both sides, the first partial shaped object PO1, the second partial shaped object PO2 is shaped by setting the discharged shaping amount MA to the third discharged shaping amount MA3 that is greater than the second discharged shaping amount MA2. The third discharged shaping amount MA3 is greater than the second discharged shaping amount MA2 when measured under the same condition. Accordingly, since the second partial shaped object PO2 is shaped by changing the discharged shaping amount MA at the time of shaping the second partial shaped object PO2 according to the adjacent state of the second partial shaped object PO2 and the first partial shaped object PO1, it is possible to prevent the generation of a gap in the three-dimensional shaped object.

The method for manufacturing a three-dimensional shaped object includes a determining step of determining, based on the shaping data for shaping the partial shaped object PO, whether the second partial shaped object PO2 is adjacent to the first partial shaped object PO1. Accordingly, it is possible to easily determine whether the second partial shaped object PO2 is adjacent to the first partial shaped object PO1.

In the method for manufacturing a three-dimensional shaped object, the discharged shaping amount MA is controlled by adjusting at least one of the number of rotations of the flat screw 40 that adjusts the supply amount per unit time of supplying the shaping material MM toward the discharging unit 60, the opening degree of the valve body 72 that adjusts the flowability of flow of the shaping material MM supplied toward the discharging unit 60, and the relative moving speed of the discharging unit 60 with respect to the shaping surface 311. Accordingly, it is possible to easily control the discharged shaping amount MA.

The three-dimensional shaping apparatus 100 includes the plasticizing unit 30 that plasticizes at least a part of the material MR to generate the shaping material MM, the discharging unit 60 that discharges the shaping material MM toward the shaping surface 311 of the table 300, the moving mechanism 400 that changes the relative position between the discharging unit 60 and the shaping surface 311, and the control unit 500. The control unit 500 is configured such that a plurality of partial shaped objects PO are shaped along a plurality of partial routes PR by causing the discharging unit 60 to discharge the shaping material MM toward the shaping surface 311 while causing the moving mechanism 400 to change the relative position. The control unit 500 is configured to, when the amount of the shaping material MM discharged toward the shaping surface 311 per unit movement amount of the discharging unit 60 is defined as a discharged shaping amount MA, adjust the discharged shaping amount MA by controlling any one of the plasticizing unit 30, the discharging unit 60, and the moving mechanism 400. When the second partial shaped object PO2 to be shaped along the partial route PR2 is not adjacent to the first partial shaped object PO1 that is shaped previously and is shaped with a gap between the first partial shaped object and the second partial shaped object, the second partial shaped object PO2 is shaped by setting the discharged shaping amount MA to the first discharged shaping amount MA1, and when the second partial shaped object PO2 is adjacent to the first partial shaped object PO1, the second partial shaped object PO2 is shaped by setting the discharged shaping amount MA to the second discharged shaping amount MA2 that is greater than the first discharged shaping amount MA1 when measured under the same condition. Accordingly, the second partial shaped object PO2 is shaped by changing the discharged shaping amount MA at the time of shaping the second partial shaped object PO2 between the case in which the second partial shaped object PO2 is adjacent to the first partial shaped object PO1 and the case in which the second partial shaped object PO2 is not adjacent to the first partial shaped object PO1, and thus it is possible to prevent the generation of a gap in the three-dimensional shaped object.

In the three-dimensional shaping apparatus 100, the plasticizing unit 30 includes the flat screw 40 that is capable of adjusting the supply amount per unit time of supplying the shaping material MM toward the discharging unit 60 by changing the number of rotations, the supply flow path 62 for supplying the shaping material MM from the plasticizing unit 30 to the discharging unit 60 is provided with the valve body 72 that is capable of adjusting the flowability of flow of the shaping material MM in the supply flow path 62 by changing the degree of opening, and the control unit 500 adjusts the discharged shaping amount MA by changing any one of the number of rotations of the flat screw 40, the opening degree of the valve body 72, and the relative moving speed of the discharging unit 60 with respect to the shaping surface 311. Accordingly, it is possible to easily control the discharged shaping amount MA.

Here, the material MR of the three-dimensional shaped object used in the above three-dimensional shaping apparatus 100 will be described. In the three-dimensional shaping apparatus 100, a three-dimensional shaped object can be shaped using, for example, various materials such as a material having thermoplasticity, a metal material, and a ceramic material as a main material. Here, the "main material" means the material MR which is a central material forming the shape of the three-dimensional shaped object, and means a material that occupies 50 wt % or more in the three-dimensional shaped object. The above shaping material MM includes a material obtained by melting the main material alone or a material obtained by melting a part of components contained together with the main material to form a paste.

When a material having thermoplasticity is used as the main material, the shaping material MM is generated by plasticizing the material in the plasticizing unit 30.

As the material having thermoplasticity, for example, the following thermoplastic resin materials can be used.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, polyether ether ketone The material having thermoplasticity may contain an additive such as wax, a flame retardant, an antioxidant, and a heat stabilizer, in addition to a pigment, a metal, and a ceramic. In the plasticizing unit 30, the material having thermoplasticity is plasticized and converted into a molten state by the rotation of the flat screw 40 and the heating of the heater 58. The shaping material MM generated by melting the material having thermoplasticity is discharged from the nozzle 61 and then is cured by a decrease in a temperature.

The material having thermoplasticity is preferably injected from the nozzle 61 in a state of being heated to a temperature equal to or higher than the glass transition point thereof and completely melted. For example, when ABS resin is used, the temperature is preferably about 200° C. at the time of discharging the ABS resin from the nozzle 61.

In the three-dimensional shaping apparatus 100, for example, the following metal materials may be used as the main material instead of the above material having thermoplasticity. In this case, it is preferable that a component melted at the time of generation of the shaping material MM is mixed with a powder material obtained by powdering the following metal material, and the mixture is input to the plasticizing unit 30 as the material MR.

Examples of Metal Material

A single metal selected from magnesium (Mg), ferrum (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chromium molybdenum, titanium alloy, nickel alloy, aluminum alloy, cobalt alloy, and cobalt chromium alloy In the three-dimensional shaping apparatus 100, a ceramic material can be used as the main material instead of the above metal material. Examples of the ceramic material include oxide ceramics such as silicon dioxide, titanium dioxide, aluminum oxide, and zirconium oxide, and non-oxide ceramics such as aluminum nitride. When the metal material or the ceramic material as described above is used as the main material, the shaping material MM discharged to the shaping surface 311 may be cured by sintering.

The powder material of the metal material or the ceramic material supplied as the material MR to the material supplying unit 20 may be a mixed material obtained by mixing a plurality of types of powder of a single metal, powder of an alloy, or powder of a ceramic material. The powder material of the metal material or the ceramic material may be coated with, for example, a thermoplastic resin as exemplified above or another thermoplastic resin. In this case, in the plasticizing unit 30, the thermoplastic resin may be melted to express fluidity.

For example, the following solvent can also be added to the powder material of the metal material or the ceramic material that is supplied to the material supplying unit 20 as the material MR. As the solvent, one type or a combination of two or more type selected from the following can be used.
Examples of Solvent Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate In addition, for example, the following binder can be added to the powder material of the metal material or the ceramic material that is supplied to the material supplying unit 20 as the material MR.
Examples of Binder An acrylic resin, an epoxy resin, a silicone resin, a cellulose-based resin, or other synthetic resins or PLA (polylactic acid), PA (polyamide), PPS (polyphenylene sulfide), PEEK (polyether ether ketone), or other thermoplastic resins

2. Second Embodiment

Next, a method for manufacturing a three-dimensional shaped object according to a second embodiment, as an embodiment of the present disclosure, will be described. The portions common to the three-dimensional shaping apparatus 100 and the method for manufacturing a three-dimensional shaped object according to the first embodiment are denoted by the same reference numerals, and descriptions thereof will be omitted.

The three-dimensional shaping apparatus 100 according to the present embodiment is the same as the three-dimensional shaping apparatus 100 according to the first embodiment. In the present embodiment, the flow of the processing when the control unit 500 executes the shaping processing of the three-dimensional shaped object is the same as that of the first embodiment except that the layer forming step of the present embodiment is different from that of the first embodiment. In the layer forming step executed by the control unit 500 in the first embodiment, the first partial shaped object PO1 is shaped based on the shaping data of the first partial shaped object PO1, and then the second partial shaped object PO2 is shaped based on the shaping data of the second partial shaped object PO2.

Figure 14:
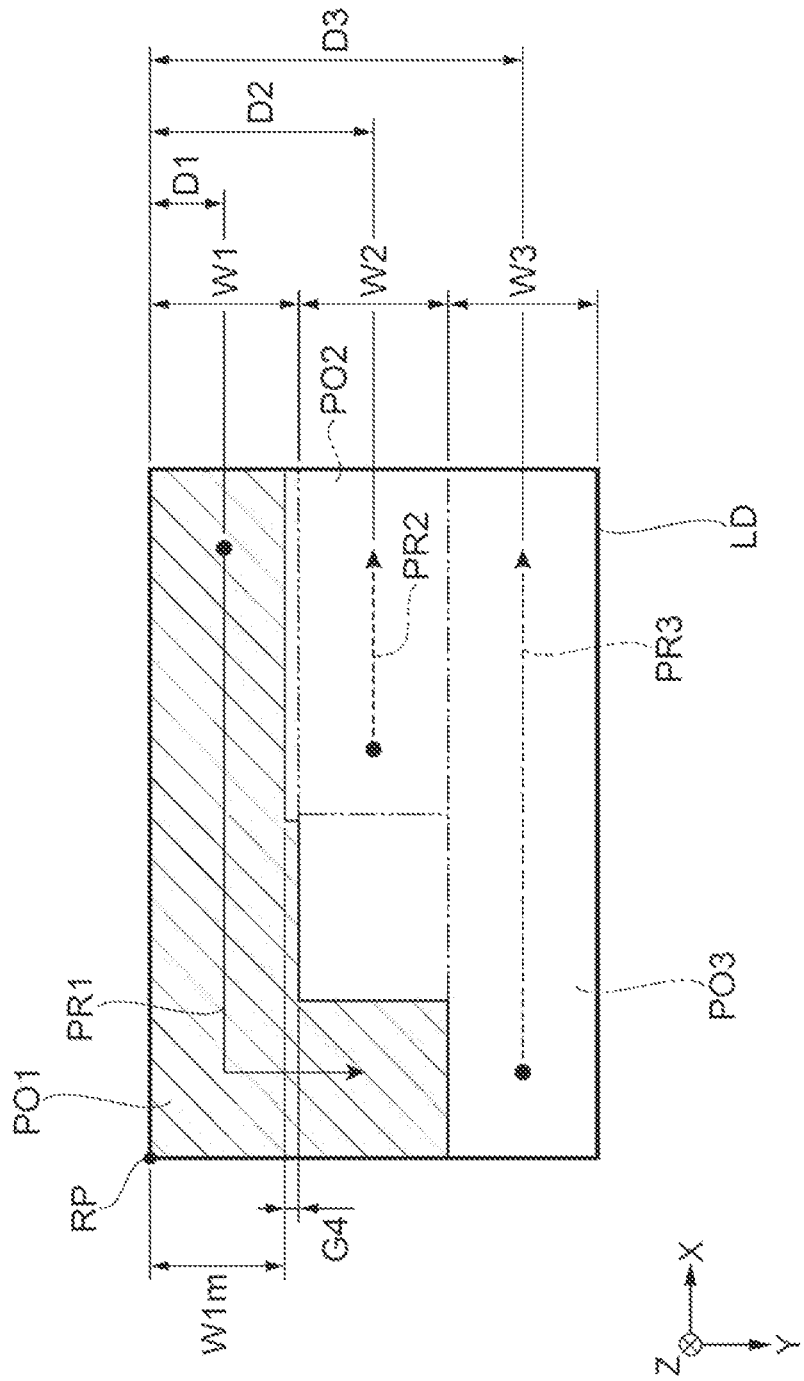
FIG. 14 is a plan view illustrating a state in which a width of the first partial shaped object in FIG. 9 is shaped to be narrower than a line width of the shaping data.

For example, in the layer forming step, the shape of the first partial shaped object PO1 shaped based on the shaping data illustrated in FIG. 7 may be different from that of the first partial shaped object PO1 in the shaping data as illustrated in FIG. 14. In the example illustrated in FIG. 14, as indicated by hatching, the line width W on the +X direction side from the center of the shaped first partial shaped object PO1 is a line width W1$m$ that is smaller than the line width W1 of the first partial shaped object PO1 in the shaping data.

In this case, if the second partial shaped object PO2 is shaped based on the shaping data in the layer forming step, a gap G4 may be generated between the first partial shaped object PO1 and the second partial shaped object PO2. As a result, a gap may be generated in the three-dimensional shaped object.

In the layer forming step according to the present embodiment, the control unit 500 executes shape measurement of the first partial shaped object PO1 by the measurement unit 90 after shaping the first partial shaped object PO1 based on the shaping data of the first partial shaped object PO1. The control unit 500 executes the determining step based on the measured value of the line width W of the shaped first partial shaped object PO1 and the shaping data. Then, the control unit 500 executes the shaping of the second partial shaped object PO2 in consideration of the result of the determining step. Accordingly, the second partial shaped object PO2 can be shaped in consideration of the shape of the shaped first partial shaped object PO1, and thus it is possible to prevent the generation of a gap in the three-dimensional shaped object.

Next, a flow of processing when the control unit 500 shapes the first partial shaped object PO1 and the second partial shaped object PO2 in the layer forming step according to the present embodiment will be described with reference to a flowchart illustrated in FIG. 15. In the present embodiment, the flow of the processing when the control unit 500 executes the shaping processing of the three-dimensional shaped object including the processing of shaping the first partial shaped object PO1 and the second partial shaped object PO2 corresponds to the method for manufacturing a three-dimensional shaped object.

In step S531, the control unit 500 shapes the first partial shaped object PO1 based on the shaping data of the first partial shaped object PO1 in the shaping data. After step S531 is executed, the control unit 500 causes the processing to proceed to step S532.

In step S532, the control unit 500 causes the measurement unit 90 to execute the shape measurement of the shaped first partial shaped object PO1. The shape measurement of the shaped first partial shaped object PO1 includes measurement of the line width W of the first partial shaped object PO1. After step S532 is executed, the control unit 500 causes the processing to proceed to step S533.

In step S533, the control unit 500 determines whether it is necessary to change the shaping data of the second partial shaped object PO2 generated in the shaping data generating step. Whether it is necessary to change the shaping data of the second partial shaped object PO2 is determined in step S533 by determining, based on the measured value of the line width W of the shaped first partial shaped object PO1 and the shaping data generated in the shaping data generating step, whether the second partial shaped object PO2 to be shaped next is adjacent to the shaped first partial shaped object PO1.

In other words, in the method for manufacturing a three-dimensional shaped object according to the present embodiment, the determining step of determining, based on the measured value of the line width W of the shaped first partial shaped object PO1 and the shaping data generated in the shaping data generating step, whether the second partial shaped object PO2 to be shaped next is adjacent to the shaped first partial shaped object PO1 is executed in the layer forming step.

For example, when the first partial shaped object PO1 is shaped as illustrated in FIG. 12, the measured value of the line width W of the shaped first partial shaped object PO1 is the same as the line width W1 of the first partial shaped object PO1 in the shaping data. In this case, based on the shaping data generated in the shaping data generating step, it is determined that the second partial shaped object PO2 is adjacent to the first partial shaped object PO1. In addition, based on the measured value of the line width W of the shaped first partial shaped object PO1 and the shaping data generated in the shaping data generating step, it is also determined that the second partial shaped object PO2 to be shaped next is adjacent to the shaped first partial shaped object PO1. In this case, the control unit 500 determines that it is not necessary to change the shaping data of the second partial shaped object PO2, and the determination in step S533 is NO. The control unit 500 causes the processing to proceed to step S535.

On the other hand, for example, when the first partial shaped object PO1 is shaped as illustrated in FIG. 14, the measured value of the line width W of the shaped first partial shaped object PO1 is the line width W1$m$ that is smaller than the line width W1 of the first partial shaped object PO1 in the shaping data. The gap G4 may be generated between the shaped first partial shaped object PO1 and the second partial shaped object PO2 in the shaping data. In this case, based on the shaping data generated in the shaping data generating step, it is determined that the second partial shaped object PO2 is adjacent to the first partial shaped object PO1. On the other hand, based on the measured value of the line width W of the shaped first partial shaped object PO1 and the shaping data generated in the shaping data generating step, it is determined that the second partial shaped object PO2 to be shaped according to the shaping data generated in the shaping data generating step is not adjacent to the shaped first partial shaped object PO1. In this case, the control unit 500 determines that it is necessary to change the shaping data of the second partial shaped object PO2, and the determination in step S533 is YES. The control unit 500 causes the processing to proceed to step S534.

In step S534, the control unit 500 changes the shaping data of the second partial shaped object PO2 generated in the shaping data generating step such that the second partial shaped object PO2 to be shaped approaches the shaped first partial shaped object PO1. For example, in step S534, as illustrated in FIG. 16, the control unit 500 changes the partial route PR2 of the second partial shaped object PO2 generated in the shaping data generating step to a partial route PR2$n$. In other words, the control unit 500 changes the distance D2 from a reference position RP to the partial route PR2 of the second partial shaped object PO2 to a distance D2$n$ smaller than the distance D2. That is, in the layer forming step, the control unit 500 executes a step of changing the partial route PR2 of the second partial shaped object PO2 included in the shaping data to a side on which the second partial shaped object PO2 to be shaped approaches the shaped first partial shaped object PO1.

As indicated by hatching in FIG. 16, when the second partial shaped object PO2 is shaped to be adjacent to the third partial shaped object PO3 in the shaping data, the control unit 500 may change the second discharged shaping amount MA2 of the second partial shaped object PO2 included in the shaping data, in addition to the above change in the partial route PR2.

For example, in step S534, the control unit 500 may change the second discharged shaping amount MA2 of the second partial shaped object PO2 included in the shaping data to a greater value such that the second partial shaped object PO2 to be shaped is adjacent to the shaped first partial shaped object PO1. In other words, in the layer forming step, the control unit 500 may execute a step of changing the second discharged shaping amount MA2 of the second partial shaped object PO2 included in the shaping data to a greater value.

After step S534 is executed, the control unit 500 causes the processing to proceed to step S535. In step S535, the control unit 500 shapes the second partial shaped object PO2 based on the shaping data of the second partial shaped object PO2. When step S535 is executed after step S534 is executed, the control unit 500 shapes the second partial shaped object PO2 based on the shaping data changed in the layer forming step. In other words, in the layer forming step, the control unit 500 controls the discharged shaping amount MA by changing the shaping data. In addition, when the determination in step S533 is NO and step S535 is executed, the control unit 500 shapes the second partial shaped object PO2 based on the shaping data generated in the shaping data generating step.

After executing the processing of step S535, the control unit 500 ends the processing of shaping the first partial shaped object PO1 and the second partial shaped object PO2 in the layer forming step.

As described above, according to the method for manufacturing a three-dimensional shaped object and the three-dimensional shaping apparatus 100 according to the second embodiment, the following effects can be exerted.

In the method for manufacturing a three-dimensional shaped object, a width of the partial shaped object PO in a direction intersecting the partial route PR is defined as the line width W, whether the second partial shaped object PO2 is adjacent to the first partial shaped object PO1 is determined in the determining step based on the shaping data and the measured value of the line width W of the shaped first partial shaped object PO1. Accordingly, it is possible to accurately determine whether the second partial shaped object PO2 is adjacent to the first partial shaped object PO1.

The method for manufacturing a three-dimensional shaped object includes a step of changing, when it is determined in the determining step, based on the shaping data, that the second partial shaped object PO2 is adjacent to the first partial shaped object PO1 and when it is determined in the determining step, based on the shaping data and the measured value, that the second partial shaped object PO2 is not adjacent to the first partial shaped object PO1, the partial route PR2 of the second partial shaped object PO2 included in the shaping data to a side where the second partial shaped object PO2 to be shaped approaches the first partial shaped object PO1, and in the layer forming step, the second partial shaped object PO2 is shaped based on the changed shaping data. Accordingly, when it is determined that the second partial shaped object PO2 is not adjacent to the first partial shaped object PO1, the second partial shaped object PO2 is shaped to be close to the first partial shaped object PO1, and thus it is possible to prevent the generation of a gap in the three-dimensional shaped object.

The method for manufacturing a three-dimensional shaped object includes a step of changing, when it is determined in the determining step, based on the shaping data, that the second partial shaped object PO2 is adjacent to the first partial shaped object PO1 and when it is determined in the determining step, based on the shaping data and the measured value, that the second partial shaped object PO2 is not adjacent to the first partial shaped object PO1, the second discharged shaping amount MA2 of the second partial shaped object PO2 included in the shaping data to a greater value, and in the layer forming step, the second partial shaped object PO2 is shaped based on the changed shaping data. Accordingly, when it is determined that the second partial shaped object PO2 is not adjacent to the first partial shaped object PO1, the second partial shaped object PO2 is shaped by changing the second discharged shaping amount MA2 of the second partial shaped object PO2 to a greater value, and thus it is possible to prevent the generation of a gap in the three-dimensional shaped object.

In the method for manufacturing a three-dimensional shaped object, in the layer forming step, the discharged shaping amount MA is controlled by changing the shaping data. Accordingly, it is possible to easily control the discharged shaping amount MA.

The three-dimensional shaping apparatus 100 includes the measurement unit 90 that is capable of measuring the line width W of the shaped partial shaped object PO, and the control unit 500 determines, based on the shaping data and the measured value of the line width W of the first partial shaped object PO1 measured by the measurement unit 90, whether the second partial shaped object PO2 is adjacent to the first partial shaped object PO1. Accordingly, it is possible to accurately determine whether the second partial shaped object PO2 is adjacent to the first partial shaped object PO1.

The method for manufacturing a three-dimensional shaped object and the three-dimensional shaping apparatus 100 according to the above embodiment of the present disclosure have basically the configuration as described above, and it is needless to say that the partial configuration may be changed or omitted without departing from the summary of the present disclosure. In addition, the above embodiments and other embodiments described below can be combined with each other so long as no technical inconsistencies are involved. Hereinafter, other embodiments will be described.

In the first embodiment, the control unit 500 may not execute the determining step in the shaping data generating step. In this case, for example, in the shaping data generating step, the control unit 500 sets the discharged shaping amount MA at the time of shaping the second partial shaped object PO2 to the first discharged shaping amount MA1 regardless of the arrangement of the first partial shaped object PO1 and the second partial shaped object PO2 in the shaping data. Further, in the layer forming step, the control unit 500 may execute the determining step based on the arrangement of the first partial shaped object PO1 and the second partial shaped object PO2 in the shaping data, and may change the discharged shaping amount MA at the time of shaping the second partial shaped object PO2 based on the result of the determining step.

In the first embodiment, the control unit 500 may not execute the determining step in the shaping data generating step. In this case, for example, in the layer forming step, the control unit 500 executes the determining step based on the arrangement of the first partial shaped object PO1 and the second partial shaped object PO2 in the shaping data, and determines the discharged shaping amount MA for achieving the desired line width W based on the result of the determining step and the data MAD. Further, the control unit 500 may shape the second partial shaped object PO2 based on the determined discharged shaping amount MA. In this case, the line width information may not include information other than the line width W.

In the second embodiment, the control unit 500 may not execute the determining step in the shaping data generating step. In this case, for example, in the shaping data generating step, the control unit 500 sets the discharged shaping amount MA at the time of shaping the second partial shaped object PO2 to the third discharged shaping amount MA3 regardless of the arrangement of the first partial shaped object PO1 and the second partial shaped object PO2 in the shaping data. Further, in the layer forming step, the control unit 500 may execute, based on the arrangement of the first partial shaped object PO1 and the second partial shaped object PO2 in the shaping data and the measured value of the line width W of the previously shaped first partial shaped object PO1, the determining step, and may change the discharged shaping amount MA at the time of shaping the second partial shaped object PO2 based on the result of the determining step.

In the second embodiment, in the layer forming step, the control unit 500 may change the shaping data of the second partial shaped object PO2 based on the result of the determining step, and may not shape the second partial shaped object PO2 based on the changed shaping data. For example, in the layer forming step, the control unit 500 executes the determining step based on the arrangement of the first partial shaped object PO1 and the second partial shaped object PO2 in the shaping data and the measured value of the line width W of the previously shaped first partial shaped object PO1. When it is determined in the determining step, based on the shaping data, that the second partial shaped object PO2 is adjacent to the first partial shaped object PO1 and when it is determined in the determining step, based on the shaping data and the measured value of the line width W of the shaped first partial shaped object PO1, that the second partial shaped object PO2 is not adjacent to the first partial shaped object PO1, the control unit 500 determines any one of the discharged shaping amount MA and the partial route PR2 for the second partial shaped object PO2 to be adjacent to the first partial shaped object PO1. Further, the control unit 500 may shape the second partial shaped object PO2 based on any one of the determined partial route PR2 and discharged shaping amount MA without changing the shaping data. In this case, the line width information may not include information other than the line width W.

In the first embodiment, the three-dimensional shaping apparatus 100 may not include the measurement unit 90.

In the above embodiment, the control unit 500 may set the line width W to the line width W1 that is greater than the line width Wn by increasing the temperature of the heater 58 of the plasticizing unit 30. Alternatively, the control unit 500 may set the line width W to the line width W1 that is greater than the line width Wn by reducing the distance between the shaping surface 311 and the nozzle 61 in the Z-axis direction.

In the above embodiment, the control unit 500 may not include a storage device. In this case, the control unit 500 may control the operations of the shaping unit 200 and the moving mechanism 400 by the processor executing a program or a command stored in a storage device provided outside the three-dimensional shaping apparatus 100, thereby executing the shaping processing for shaping a three-dimensional shaped object.

What is claimed is:

1. A method for manufacturing a three-dimensional shaped object by discharging a shaping material from a discharging unit toward a shaping surface of a table, the method comprising:
 a plasticizing step of plasticizing at least a part of a material to generate the shaping material; and
 a layer forming step of shaping, based on shaping data, a plurality of partial shaped objects along a partial route to form a layer on the shaping surface, by discharging the shaping material toward the shaping surface while moving the discharging unit along the partial route, wherein
 when an amount of the shaping material discharged toward the shaping surface per unit movement amount of the discharging unit is defined as a discharged shaping amount,
 in the layer forming step,
 in a case in which a second partial shaped object to be shaped along the partial route is not adjacent to a first partial shaped object that is shaped previously and is shaped with a gap between the first partial shaped object and the second partial shaped object, the second partial shaped object is shaped by setting the discharged shaping amount to a first discharged shaping amount, and
 in a case in which the second partial shaped object is adjacent to the first partial shaped object, the second partial shaped object is shaped by setting the discharged shaping amount to a second discharged shaping amount, and
 the second discharged shaping amount is greater than the first discharged shaping amount when measured under the same condition.

2. The method for manufacturing a three-dimensional shaped object according to claim 1, wherein
 the second partial shaped object has a pair of side surfaces that face outwardly opposite to each other,
 in the layer forming step, when the second partial shaped object is adjacent to the first partial shaped object one each of the pair of side surfaces in a plan view, the second partial shaped object is shaped by setting the discharged shaping amount to a third discharged shaping amount that is greater than the second discharged shaping amount, and
 the third discharged shaping amount is greater than the second discharged shaping amount when measured under the same condition.

3. The method for manufacturing a three-dimensional shaped object according to claim 1, further comprising:
 a determining step of determining, based on the shaping data for shaping the partial shaped object, whether the second partial shaped object is adjacent to the first partial shaped object.

4. The method for manufacturing a three-dimensional shaped object according to claim 3, wherein
 a width of the partial shaped object in a direction intersecting the partial route is defined as a line width, and
 in the determining step, whether the second partial shaped object is adjacent to the first partial shaped object is determined based on the shaping data and a measured value of the line width of the shaped first partial shaped object.

5. The method for manufacturing a three-dimensional shaped object according to claim 4, further comprising:
 a step of changing, when the determining step determines, based on the shaping data, that the second partial shaped object is adjacent to the first partial shaped object and when it is determined in the determining step, based on the shaping data and the measured value, that the second partial shaped object is not adjacent to the first partial shaped object, the partial route of the second partial shaped object included in the shaping data to a side where the shaped second partial shaped object approaches the first partial shaped object, wherein
 in the layer forming step, the second partial shaped object is shaped based on the changed shaping data.

6. The method for manufacturing a three-dimensional shaped object according to claim 4, further comprising:
 a step of changing, when the determining step determines, based on the shaping data, that the second partial shaped object is adjacent to the first partial shaped object and when it is determined in the determining step, based on the shaping data and the measured value, that the second partial shaped object is not adjacent to the first partial shaped object, the second discharged shaping amount of the second partial shaped object included in the shaping data to a greater value, wherein
 in the layer forming step, the second partial shaped object is shaped based on the changed shaping data.

7. The method for manufacturing a three-dimensional shaped object according to claim 1, wherein
 in the layer forming step, the discharged shaping amount is controlled by changing the shaping data.

8. The method for manufacturing a three-dimensional shaped object according to claim 1, wherein
 the discharged shaping amount is controlled by adjusting at least one of number of rotations of a screw configured to adjust a supply amount per unit time of supplying the shaping material toward the discharging unit, an opening degree of an adjustment valve configured to adjust flowability of flow of the shaping material supplied toward the discharging unit, and a relative moving speed of the discharging unit with respect to the shaping surface.

9. A three-dimensional shaping apparatus comprising:
 a plasticizing unit configured to plasticize at least a part of a material to generate a shaping material;
 a discharging unit configured to discharge the shaping material toward a shaping surface of a table;
 a moving mechanism configured to change a relative position between the discharging unit and the shaping surface; and
 a control unit, wherein
 the control unit is configured such that a plurality of partial shaped objects are shaped along a plurality of partial routes by causing the discharging unit to discharge the shaping material toward the shaping surface while causing the moving mechanism to change the relative position,
 the control unit is configured to, when an amount of the shaping material discharged toward the shaping surface per unit movement amount of the discharging unit is defined as a discharged shaping amount, adjust the discharged shaping amount by controlling any one of the plasticizing unit, the discharging unit, and the moving mechanism,
 when a second partial shaped object to be shaped along the partial route is not adjacent to a first partial shaped object that shaped previously and is shaped with a gap between the first partial shaped object and the second partial shaped object, the second partial shaped object is shaped by setting the discharged shaping amount to a first discharged shaping amount, and when the second partial shaped object is adjacent to the first partial shaped object, the second partial shaped object is shaped by setting the discharged shaping amount to a second discharged shaping amount that is greater than the first discharged shaping amount when measured under the same condition.

\* \* \* \* \*